United States Patent
Deaner et al.

(10) Patent No.: US 8,829,097 B2
(45) Date of Patent: Sep. 9, 2014

(54) PLA-CONTAINING MATERIAL

(71) Applicant: Andersen Corporation, Bayport, MN (US)

(72) Inventors: Michael Deaner, Osceola, WI (US); Patrick Gronlund, Somerset, WA (US); Larry Morelli, Stillwater, MN (US); Stacha Reed, River Falls, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 13/768,685

(22) Filed: Feb. 15, 2013

(65) Prior Publication Data

US 2013/0217815 A1 Aug. 22, 2013

Related U.S. Application Data

(60) Provisional application No. 61/600,292, filed on Feb. 17, 2012.

(51) Int. Cl.
| | | |
|---|---|---|
| *C08K 3/22* | (2006.01) | |
| *C08K 5/29* | (2006.01) | |
| *C08K 13/02* | (2006.01) | |
| *C08K 9/02* | (2006.01) | |
| *C08L 67/04* | (2006.01) | |

(52) U.S. Cl.
CPC ......... *C08K 13/02* (2013.01); *C08K 2003/2241* (2013.01); *C08K 3/22* (2013.01); *C08K 5/29* (2013.01); *C08K 9/02* (2013.01); *C08L 67/04* (2013.01)
USPC .......................................... 524/431; 524/195

(58) Field of Classification Search
CPC ............................... C08K 13/02; C08L 67/04
USPC ........................................................ 524/431
See application file for complete search history.

(56) References Cited

U.S. PATENT DOCUMENTS

| | | | |
|---|---|---|---|
| 3,193,522 A | 7/1965 | Neumann | |
| 5,010,145 A | 4/1991 | Ikada et al. | |
| 5,210,170 A | 5/1993 | Quiring et al. | |
| 5,300,576 A | 4/1994 | Nemphos et al. | |
| 5,405,921 A | 4/1995 | Muschiatti et al. | |
| 5,406,768 A | 4/1995 | Giuseppe et al. | |
| 5,439,749 A | 8/1995 | Klasell et al. | |
| 5,441,801 A | 8/1995 | Deaner et al. | |
| 5,475,080 A | 12/1995 | Gruber et al. | |
| 5,486,553 A | 1/1996 | Deaner et al. | |
| 5,497,594 A | 3/1996 | Giuseppe et al. | |
| 5,518,677 A | 5/1996 | Deaner et al. | |
| 5,536,807 A | 7/1996 | Gruber et al. | |
| 5,539,027 A | 7/1996 | Deaner et al. | |
| 5,585,155 A | 12/1996 | Heikkila et al. | |
| 5,614,483 A | 3/1997 | Fessenbecker et al. | |
| 5,665,439 A | 9/1997 | Andersen et al. | |
| 5,686,540 A | 11/1997 | Kakizawa | |
| 5,695,874 A | 12/1997 | Deaner et al. | |
| 5,746,958 A | 5/1998 | Gustafsson et al. | |
| 5,773,138 A | 6/1998 | Seethamraju et al. | |
| 5,827,607 A | 10/1998 | Deaner et al. | |
| 5,851,469 A | 12/1998 | Muller et al. | |
| 5,882,564 A | 3/1999 | Puppin | |
| 5,883,199 A | 3/1999 | McCarthy et al. | |
| 5,932,334 A | 8/1999 | Deaner et al. | |
| 5,948,505 A | 9/1999 | Puppin | |
| 5,948,524 A | 9/1999 | Seethamraju et al. | |
| 5,981,067 A | 11/1999 | Seethamraju et al. | |
| 5,985,429 A | 11/1999 | Plummer et al. | |
| 6,004,668 A | 12/1999 | Deaner et al. | |
| 6,007,656 A | 12/1999 | Heikkila et al. | |
| 6,015,611 A | 1/2000 | Deaner et al. | |
| 6,015,612 A | 1/2000 | Deaner et al. | |
| 6,037,039 A | 3/2000 | Koike et al. | |
| 6,054,207 A | 4/2000 | Finley | |
| 6,071,984 A | 6/2000 | Grigat et al. | |
| 6,103,035 A | 8/2000 | Hanson et al. | |
| 6,122,877 A | 9/2000 | Hendrickson et al. | |
| 6,150,438 A | 11/2000 | Shiraishi et al. | |
| 6,207,792 B1 | 3/2001 | Gruber et al. | |
| 6,210,792 B1 | 4/2001 | Seethamraju et al. | |
| 6,262,184 B1 | 7/2001 | Kanamori et al. | |
| 6,265,037 B1 | 7/2001 | Godavarti et al. | |
| 6,280,667 B1 | 8/2001 | Koenig et al. | |
| 6,342,172 B1 | 1/2002 | Finley | |
| 6,355,772 B1 | 3/2002 | Gruber et al. | |
| 6,357,197 B1 | 3/2002 | Serino et al. | |

(Continued)

FOREIGN PATENT DOCUMENTS

| | | | |
|---|---|---|---|
| CN | 101302284 A | 11/2008 | |
| CN | 101544813 A | 9/2009 | |

(Continued)

OTHER PUBLICATIONS

International Search Report and Written Opinion received in PCT/US2013/026395, issued by the European Patent Office on Apr. 23, 2013 (12 pages).

"Voluntary Specification, Performance Requirements and Test Procedures for High Performance Organic Coatings on Aluminum Extrusions and Panels: AAMA 2604-05," *American Architectural Manufacturers Association*, Schaumburg, IL, Jul. 2005; 10 pgs.

"Voluntary Specification, Performance Requirements and Test Procedures for Superior Performing Organic Coatings on Aluminum Extrusions and Panels: AAMA 2605-05," *American Architectural Manufacturers Association*, Schaumburg, IL, Jul. 2005; 10 pgs.

"Voluntary Specification, Performance Requirements and Test Procedures for High Performance Organic Coatings on Plastic Profiles: AAMA 614-05," *American Architectural Manufacturers Association*, Schaumburg, IL, Dec. 2005; 9 pgs.

(Continued)

*Primary Examiner* — Hui Chin
(74) *Attorney, Agent, or Firm* — Mueting, Raasch & Gebhardt, P.A.

(57) ABSTRACT

PLA-containing materials, and building components containing such materials, include: polylactic acid (PLA); one or more inorganic pigments; and one or more stabilizers that includes one or more carbodiimide groups.

31 Claims, 6 Drawing Sheets

(56) References Cited

U.S. PATENT DOCUMENTS

| | | | |
|---|---|---|---|
| 6,482,341 B1 | 11/2002 | Jongboom et al. | |
| 6,498,225 B2 | 12/2002 | Tebbe et al. | |
| 6,506,873 B1 | 1/2003 | Ryan et al. | |
| 6,509,397 B1 | 1/2003 | Nagele et al. | |
| 6,527,532 B1 | 3/2003 | Muller et al. | |
| 6,559,244 B1 | 5/2003 | Sodergard et al. | |
| 6,562,938 B2 | 5/2003 | Haile et al. | |
| 6,579,605 B2 | 6/2003 | Zehner | |
| 6,680,090 B2 | 1/2004 | Godavarti et al. | |
| 6,682,789 B2 | 1/2004 | Godavarti et al. | |
| 6,682,814 B2 | 1/2004 | Hendrickson et al. | |
| 6,833,097 B2 | 12/2004 | Miyachi | |
| 6,869,985 B2 | 3/2005 | Mohanty et al. | |
| 7,015,269 B1 | 3/2006 | Grutke et al. | |
| 7,034,102 B2 | 4/2006 | Tobita et al. | |
| 7,083,673 B2 | 8/2006 | Bowden et al. | |
| 7,084,192 B2 | 8/2006 | Ouchi et al. | |
| 7,125,842 B2 | 10/2006 | Kawabe et al. | |
| 7,132,490 B2 | 11/2006 | Obuchi et al. | |
| 7,138,439 B2 | 11/2006 | Scheer et al. | |
| 7,157,140 B1 | 1/2007 | Hoppe | |
| 7,173,080 B2 | 2/2007 | Yamada et al. | |
| 7,256,223 B2 | 8/2007 | Mohanty et al. | |
| 7,268,190 B2 | 9/2007 | Ohme et al. | |
| 7,273,902 B2 | 9/2007 | Takahashi et al. | |
| 7,354,656 B2 | 4/2008 | Mohanty et al. | |
| 7,361,701 B2 | 4/2008 | Takahashi et al. | |
| 7,368,493 B2 | 5/2008 | Takahashi et al. | |
| 7,368,511 B2 | 5/2008 | Hale et al. | |
| 7,393,590 B2 | 7/2008 | Scheer et al. | |
| 7,410,687 B2 | 8/2008 | Dolinar | |
| 7,445,835 B2 | 11/2008 | Serizawa et al. | |
| 7,585,910 B2 | 9/2009 | Okamoto et al. | |
| 7,589,137 B2 | 9/2009 | Sato et al. | |
| 7,592,388 B2 | 9/2009 | Wick et al. | |
| 7,645,823 B2 | 1/2010 | Horie et al. | |
| 7,652,085 B2 | 1/2010 | Takenaka et al. | |
| 7,670,545 B2 | 3/2010 | Bopp et al. | |
| 7,671,117 B2 | 3/2010 | Sato et al. | |
| 7,682,548 B2 | 3/2010 | Nishida et al. | |
| 7,723,460 B2 | 5/2010 | Shimura et al. | |
| 7,736,560 B2 | 6/2010 | Nelson | |
| 7,754,324 B2 | 7/2010 | Watanabe et al. | |
| 7,816,424 B2 | 10/2010 | Takahashi et al. | |
| 7,825,179 B2 | 11/2010 | Kawahara et al. | |
| 7,867,422 B2 | 1/2011 | Nelson et al. | |
| 8,013,031 B2 | 9/2011 | Cink et al. | |
| 8,030,382 B2 | 10/2011 | Endo et al. | |
| 8,133,558 B2 | 3/2012 | Tweed et al. | |
| 8,197,929 B2 | 6/2012 | Watanabe et al. | |
| 8,231,954 B2 | 7/2012 | Li et al. | |
| 2002/0132960 A1 | 9/2002 | Haile et al. | |
| 2002/0136848 A1 | 9/2002 | Yoshii et al. | |
| 2004/0180990 A1 | 9/2004 | Suzuki et al. | |
| 2004/0198120 A1 | 10/2004 | Scott et al. | |
| 2005/0001358 A1 | 1/2005 | Nakazawa et al. | |
| 2006/0000390 A1* | 1/2006 | Bolt et al. | 106/442 |
| 2006/0076545 A1 | 4/2006 | Reynders et al. | |
| 2006/0099394 A1 | 5/2006 | Dolinar et al. | |
| 2006/0275594 A1 | 12/2006 | Wick et al. | |
| 2006/0281842 A1 | 12/2006 | Hoppe | |
| 2007/0176315 A1 | 8/2007 | Hashiba et al. | |
| 2007/0203276 A1 | 8/2007 | Fenyvesi et al. | |
| 2007/0218275 A1 | 9/2007 | Parris et al. | |
| 2007/0259584 A1 | 11/2007 | Whitehouse | |
| 2007/0270535 A1 | 11/2007 | Yasui et al. | |
| 2008/0076880 A1 | 3/2008 | Nakagawa et al. | |
| 2008/0108742 A1 | 5/2008 | Miyamoto et al. | |
| 2008/0125532 A1 | 5/2008 | Nelson | |
| 2008/0145656 A1 | 6/2008 | Jung | |
| 2008/0262118 A1 | 10/2008 | Cink et al. | |
| 2009/0054602 A1 | 2/2009 | Uradnisheck | |
| 2009/0082484 A1 | 3/2009 | Hirose et al. | |
| 2009/0110654 A1 | 4/2009 | Hagemann et al. | |
| 2009/0137748 A1 | 5/2009 | Tanaka et al. | |
| 2009/0169844 A1 | 7/2009 | Yamamura et al. | |
| 2009/0176938 A1 | 7/2009 | Xu et al. | |
| 2009/0221755 A1 | 9/2009 | Aoki et al. | |
| 2009/0226655 A1 | 9/2009 | Sugai et al. | |
| 2009/0239433 A1 | 9/2009 | Kurihara et al. | |
| 2009/0261510 A1 | 10/2009 | De Vos | |
| 2009/0274885 A1 | 11/2009 | Egawa | |
| 2009/0311511 A1 | 12/2009 | Obuchi et al. | |
| 2010/0003438 A1 | 1/2010 | Bryant et al. | |
| 2010/0093888 A1 | 4/2010 | Endo et al. | |
| 2010/0111847 A1 | 5/2010 | Boyden et al. | |
| 2010/0119417 A1 | 5/2010 | Motadel et al. | |
| 2010/0120991 A1 | 5/2010 | Toyohara et al. | |
| 2010/0130676 A1 | 5/2010 | Suzuki et al. | |
| 2010/0130699 A1 | 5/2010 | Ikegame et al. | |
| 2010/0144936 A1 | 6/2010 | Sato et al. | |
| 2010/0152415 A1 | 6/2010 | Benson | |
| 2010/0212930 A1 | 8/2010 | Yasumoto et al. | |
| 2010/0227963 A1 | 9/2010 | Hironaka et al. | |
| 2010/0234536 A1 | 9/2010 | Oda et al. | |
| 2010/0240801 A1 | 9/2010 | Nelson et al. | |
| 2010/0291388 A1 | 11/2010 | Alvarez et al. | |
| 2011/0003917 A1 | 1/2011 | Negishi et al. | |
| 2011/0123809 A1 | 5/2011 | Riebel et al. | |
| 2011/0152403 A1 | 6/2011 | Nelson et al. | |
| 2011/0230599 A1 | 9/2011 | Deaner et al. | |
| 2012/0184672 A1 | 7/2012 | Riscanu et al. | |
| 2012/0220697 A2* | 8/2012 | Deaner et al. | 524/13 |
| 2013/0004703 A1* | 1/2013 | Kwon et al. | 428/106 |

FOREIGN PATENT DOCUMENTS

| | | | |
|---|---|---|---|
| CN | 101665619 A | 3/2010 | |
| EP | 1 152 024 A1 | 11/2001 | |
| EP | 1 813 969 A1 | 8/2007 | |
| EP | 1 833 933 B1 | 2/2009 | |
| EP | 2 328 978 A2 | 6/2011 | |
| FI | WO0077335 * | 12/2000 | E06B 1/26 |
| FR | 2941702 A1 | 8/2010 | |
| JP | 2007 191550 A | 8/2007 | |
| JP | 2008 062428 A | 3/2008 | |
| JP | 2009 062410 | 3/2009 | |
| JP | 2011 162713 | 8/2011 | |
| KR | 2006 0061301 A | 6/2006 | |
| KR | 2007 0113693 A | 11/2007 | |
| WO | WO 99/11699 | 3/1999 | |
| WO | WO 02/102582 A2 | 12/2002 | |
| WO | WO 2004/113435 A1 | 12/2004 | |
| WO | WO 2005/012408 A2 | 2/2005 | |
| WO | WO 2005/012408 A3 | 2/2005 | |
| WO | WO 2006/096694 A2 | 9/2006 | |
| WO | WO 2006/096694 A3 | 9/2006 | |
| WO | WO 2009/120311 A2 | 10/2009 | |
| WO | WO 2010/002546 A2 | 1/2010 | |
| WO | WO 2010/132066 A1 | 11/2010 | |
| WO | WO 2011/116122 | 9/2011 | |
| WO | WO 2012/094758 A1 | 7/2012 | |

OTHER PUBLICATIONS

"Voluntary Specification, Performance Requirements and Test Procedures for Superior Performing Organic Coatings on Plastic Profiles: AAMA 615-02," *American Architectural Manufacturers Association*, Schaumburg, IL, Jun. 2002; 9 pgs.

"Voluntary Specification, Performance Requirements and Test Procedures for High Performance Organic Coatings on Fiber Reinforced Thermoset Profiles: AAMA 624-07," *American Architectural Manufacturers Association*, Schaumburg, IL, Jan. 2007; 10 pgs.

"Voluntary Specification, Performance Requirements and Test Procedures for Superior Performance Organic Coatings on Fiber Reinforced Thermoset Profiles: AAMA 625-07," *American Architectural Manufacturers Association*, Schaumburg, IL, Jan. 2007; 10 pgs.

ASTM: D2244-02 "Standard Practice for Calculation of Color Tolerances and Color Differences from Instrumentally Measured Color Coordinates," *Annual Book of ASTM Standards*, vol. 06.01; Jul. 2003; 244-253.

ASTM: D4214-07 "Standard Test Methods for Evaluating the Degree of Chalking of Exterior Paint Films," *Annual Book of ASTM Standards*, vol. 06.01; Jul. 2007; 5 pgs.

(56) References Cited

OTHER PUBLICATIONS

ASTM: D 523-89 "Standard Test Method for Specular Gloss," *Annual Book of ASTM Standards*, vol. 06.01; May 1989; 36-40.
ASTM: G155-05a "Standard Practice for Operating Xenon Arc Light Apparatus for Exposure of Non-Metallic Materials," *Annual Book of ASTM Standards*; Nov. 2005; 11 pgs.
Auras (Ed)., "Poly(lactic acid): Synthesis, Structures, Properties, Processing, and Applications," Oct. 2010, *Wiley Series on Polymer Engineering and Technology*; cover page, title page, publisher's page, and table of contents only, 15 pgs.
Athanasiou et al., "The effects of porosity on in vitro degradation of polylactic acid-polyglycolic acid implants used in repair of articular cartilage," *Tissue Engineering*, Jan. 15, 2007;4(1):53-63.
Baclawski and Murrey, "Rigid PVC Injection Molding," *Engineering with Rigid PVC*, New York, New York, 1984, p. 344.
Butylina et al., "Comparison of Water Absorption and Mechanical Properties of Wood-plastic Composites Made from Polypropylene and polylactic Acid," *Wood material Science and Engineering*, Nov. 20, 2010;5: 220-228.
Daniels et al., "Mechanical properties of biodegradable polymers and composites proposed for internal fixation of bone," *J of Applied Biomaterials*, Spring 1990;1(1):57-78.
De Kee et al., Mechanical and Thermal Properties of PLA/clay/wood Nanocomposites, 4 pgs.; Tulane University, New Orleans, LA.
"Engineered Bioplastic Compounds," datasheet [online]. RTP Company [retrieved on Oct. 11, 2011]. Retrieved from the Internet<URL:http://www.rtpcompany.com/info/data/bioplastics/index.htm>; 3 pgs.
Eyerer et al., "Opportunities and (in Particular) Risks of Use (Utilization Phase) of Plastic Structural Components," *Polymers—Opportunities and Risks 1, The Handbook of Environmental Chemistry*, 2010;vol. 11/2010:363-389.
Fambri and Migliaresi, "Chapter 9: Crystallization and Thermal Properties," *Poly(Lactic Acid) Synthesis, Structures, Properties, Processing, and Applications*, Wiley & Sons, Inc., Hoboken, NJ, 2010:113-123.
"Functional Additives: Durastrength® 506: Advanced Acrylic Impact Modifier," 2009; 2 pgs. Arkema Inc., Philadelphia, PA.
Ghosh et al., "Chapter 18.3: Composites: Reinforcements," *Poly(Lactic Acid) Synthesis, Structures, Properties, Processing, and Applications*, Wiley & Sons, Inc., Hoboken, NJ, 2010:294-296.
Gomez, "Polymer Preparation," *Engineering with Rigid PVC*, New York, New York, 1984, p. 29.
Guan et al., "Acetylated starch-polylactic acid loose-fill packaging materials," *Industrial Crops and Products*, Sep. 2005; 22(2): 109-123.
Huda et al., Mechanical, Thermal and Morphological Studies of Poly(lactic acid) PLA/talc/recycled Newspaper Fiber Hybrid 'Green' Composites, $8_6$ International Conference on Woodfiber-Plastic Composites, May 23-25, Michigan State University, East Lansing, Michigan. 2005; 42 pages.
Huda et al., "Physicomechanical Properties of "Green" Compositions from Polylactic Acid (PLA) and Cellulose Fibers," *GPEC*, 2004; Paper abstract 311, 13 pgs.
Huda et al., Wood Fiber Reinforced Poly(lactic acid) Composites, Paper presented at $5^{th}$ Annual SPE Automotive Composites Conference, Sep. 12-14, 2005; 12 pgs. Troy, Michigan.
Jellinek, H.G., ed., "Degradation and Stabilization of Polymers," vol. 2 (1989), pp. 517-519.
Jiang et al., "Study of Biodegradable Polylactide/Poly(butylene adipate-*co*-terephthalate) Blends," *Biomacromolecules*, Jan. 2006;7:199-207.
Li et al., "Structure-property relationships in the case of the degradation of massive poly($\alpha$-hydroxy acids) in aqueous media, Part 3 Influence of the morphology of poly(L-lactic acid)," *J of Materials Science: Materials in Medicine I*, Nov. 1990:1(4):198-206.
Li et al., "Effect of nucleation and plasticization on the crystallization of poly(lactic acid)," Polymer, Jul. 20, 2007;48:6855-6866.
Lim et al., "Chapter 14.5: Processing of Poly(lactic acid): Extrusion," *Poly(Lactic Acid) Synthesis, Structures, Properties, Processing, and Applications*, Wiley & Sons, Inc., Hoboken, NJ, 2010:195-196.
Mathew et al., "Mechanical Properties of biodegradable composites from poly-lactic acid (PLA) and microcrystalline cellulose (MCC)," *J of Applied Polymer Science*, Jun. 23, 2005;97(5):2014-2025. [Abstract].
Mathew et al., "The effect of morphology and chemical characteristics of cellulose reinforcements on the crystallinity of polylactic acid," *J of Applied Polymer Science*, Apr. 25, 2006; 101(1):300-310.
Middleton et al., "Synthetic biodegradable polymers as orthopedic devices," *Biomaterials*, Dec. 1, 2000;21(23):2335-2346.
Niaounakis et al., "Effects of aging on the thermomechanical properties of poly(lactic acid)," *J of Applied Polymer Science*, Jan. 5, 2011;119(1):472-481.
Petinakis et al., "Effect of Matrix-Particle Interfacial Adhesion on the Mechanical Properties of Poly(lactic acid)/Wood-Flour Micro-Composites," *J of Polymers and Environ.*, Jun. 2009;17(2):83-94. [Abstract].
Pilla et al., Polylactide-pine Wood Flour composites (report), *Polymer Engineering and Science*, Mar. 1, 2008; 3 pgs.
"RTP Company's Glass Fiber Reinforced PLA Bioplastic Compounds Improve Strength and Thermal Performance," Press Release, 2011, RTP Co., [online] [retrieved on Oct. 11, 2011] from the Internet. Retrieved from the Internet:<URL:http://www.rtpcompany.com/news/press/reinforced-pla.htm>; 3 pgs.
"RTP Company Receives USDA Certified Biobased Product Label for Two PLA-Based Compounds," Press Release, 2011, RTP Co., [online] [retrieved on Oct. 11, 2011] from the Internet. Retrieved from the Internet: <URL:http://www.rtpcompany.com/news/press/usda=biobased.htm>; 2 pgs.
Tidjani, "Photooxidation of Polypropylene Under Natural and Accelerated Weathering Conditions," Journal of Applied Polymer Science 64, 2497-2503, (1997).
Tsuji, "Chapter 21: Hydrolytic Degradation," *Poly(Lactic Acid) Synthesis, Structures, Properties, Processing, and Applications*, Wiley & Sons, Inc., Hoboken, NJ, 2010: 345-376.
"Weather Testing for the Real World," *Plastics Technology*, Apr. 2008; 6 pgs.
Yang et al, "Stabilization of Poly(Lactic Acid) by Carbodiimide," Polymer Degradation and Stability, 93, (2008), 1923-1929.
Yu et al., "Polymer blends and composites from renewable resources," *Prog Polym Sci*, Jun. 2006;31(6):576-602.

\* cited by examiner

PLA-CONTAINING MATERIAL

CROSS-REFERENCE TO RELATED APPLICATIONS

The present application claims priority to U.S. Provisional Application Ser. No. 61/600,292, filed Feb. 17, 2012, which is incorporated herein in its entirety.

BACKGROUND

Structural and decorative members made from polymeric materials are well known in the building industry. For example, many parts of windows, doors, railings, decking, siding, flooring, fencing, trim, and the like (which are non-limiting examples of building components) are produced by extrusion of polymers such as polyvinyl chloride (PVC) or composites made of PVC and fillers such as wood fiber, other organic and inorganic fillers, binders, and/or reinforcing materials. Other thermoplastic polymers, such as polyethylene, polypropylene, and acrylonitrile butadiene styrene (ABS), along with a variety of thermoset polymers, have also been found useful. A more sustainable class of polymers with less of an environmental impact is the class known as biopolymers such as polyesters derived from renewable resources, of which polylactic acid (PLA) is an example. PLA can be produced by fermentation of corn or other renewable resources, and degrades to relatively harmless substances after its useful life when deposited in a landfill or other waste location. PLA may also be depolymerized into lactic acid and repolymerized after appropriate processing to allow more economically viable recycling into a wide variety of useful products, thereby reducing the disposal burden. PLA is thus recyclable as well as being renewable.

PLA's sensitivity to hydrolysis and high temperatures, and particularly its relatively low heat distortion temperature (HDT), has made PLA, alone, unsuitable for use in most building construction materials and other components that may be exposed to the elements. Also, like other polyesters, adhesion of other polymers or coatings to the surface of PLA may be difficult to achieve. Thus, mechanisms that improve these deficiencies of PLA are desirable.

SUMMARY

The present disclosure provides PLA-containing materials. Such materials have improved properties (e.g., improved relative to PLA alone) such that the materials can be used in building components, particularly fenestration components like window and door components.

In one embodiment, a PLA-containing material is provided that includes: polylactic acid (PLA); one or more inorganic pigments; and one or more stabilizers that includes one or more carbodiimide functional groups. The types and amounts of PLA, pigment, and stabilizer are selected to provide a material that demonstrates no greater than 5ΔE Units (Hunter) of color change over a period of 1 year of South Florida exposure, or simulation of 1 year of South Florida exposure through accelerated weathering. Herein, "ΔE" means Delta E.

In another embodiment, a PLA-containing material is provided that includes: polylactic acid (PLA); at least 1 wt-% of one or more inorganic pigments; and at least 0.1 wt-% of one or more stabilizers comprising one or more carbodiimide functional groups; wherein the percentages are based on the total weight of the PLA-containing material.

In other embodiments, the present disclosure provides building components, particularly fenestration components.

In one such embodiment, a PLA-containing building component is provided that includes: polylactic acid (PLA); at least 3 wt-% $TiO_2$ pigment, based on the total weight of the PLA-containing building component; and at least 0.5 wt-% of one or more stabilizers comprising one or more carbodiimide groups, based on the total weight of the PLA-containing building component.

In another embodiment, a PLA-containing building component is provided that includes: polylactic acid (PLA); 3 wt-% to 12 wt-% $TiO_2$ pigment, based on the total weight of the PLA-containing building component; and 0.5 wt-% to 3.75 wt-% of one or more stabilizers comprising one or more carbodiimide groups, based on the total weight of the PLA-containing building component. The PLA, $TiO_2$ pigment, and stabilizer are preferably selected to provide a material that demonstrates no greater than 5ΔE Units (Hunter) of color change over a period of 1 year of South Florida exposure, or simulation of 1 year of South Florida exposure through accelerated weathering.

In another embodiment, a PLA-containing fenestration component is provided that includes:
polylactic acid (PLA); 3.75 wt-% to 12 wt-% $TiO_2$ pigment, based on the total weight of the PLA-containing fenestration component; and 0.6 wt-% to 3.75 wt-% of one or more stabilizers comprising one or more carbodiimide groups, based on the total weight of the PLA-containing fenestration component. The PLA, $TiO_2$ pigment, and stabilizer are preferably selected to provide a material that demonstrates no greater than 5ΔE Units (Hunter) of color change over a period of 1 year of South Florida exposure, or simulation of 1 year of South Florida exposure through accelerated weathering.

As used herein, "South Florida exposure" refers to outdoor exposure south of Latitude 27° North at a 45° angle facing south, with no overhangs, eaves, or other blockages present to protect the samples or cast shadows as specified in the American Architectural Manufacturers Association coatings performance specifications, including AAMA 2604-05, AAMA 614-05, AAMA 624-07, AAMA 2605-05, AAMA 615-02, and AAMA 625-07.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

Terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the disclosure, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
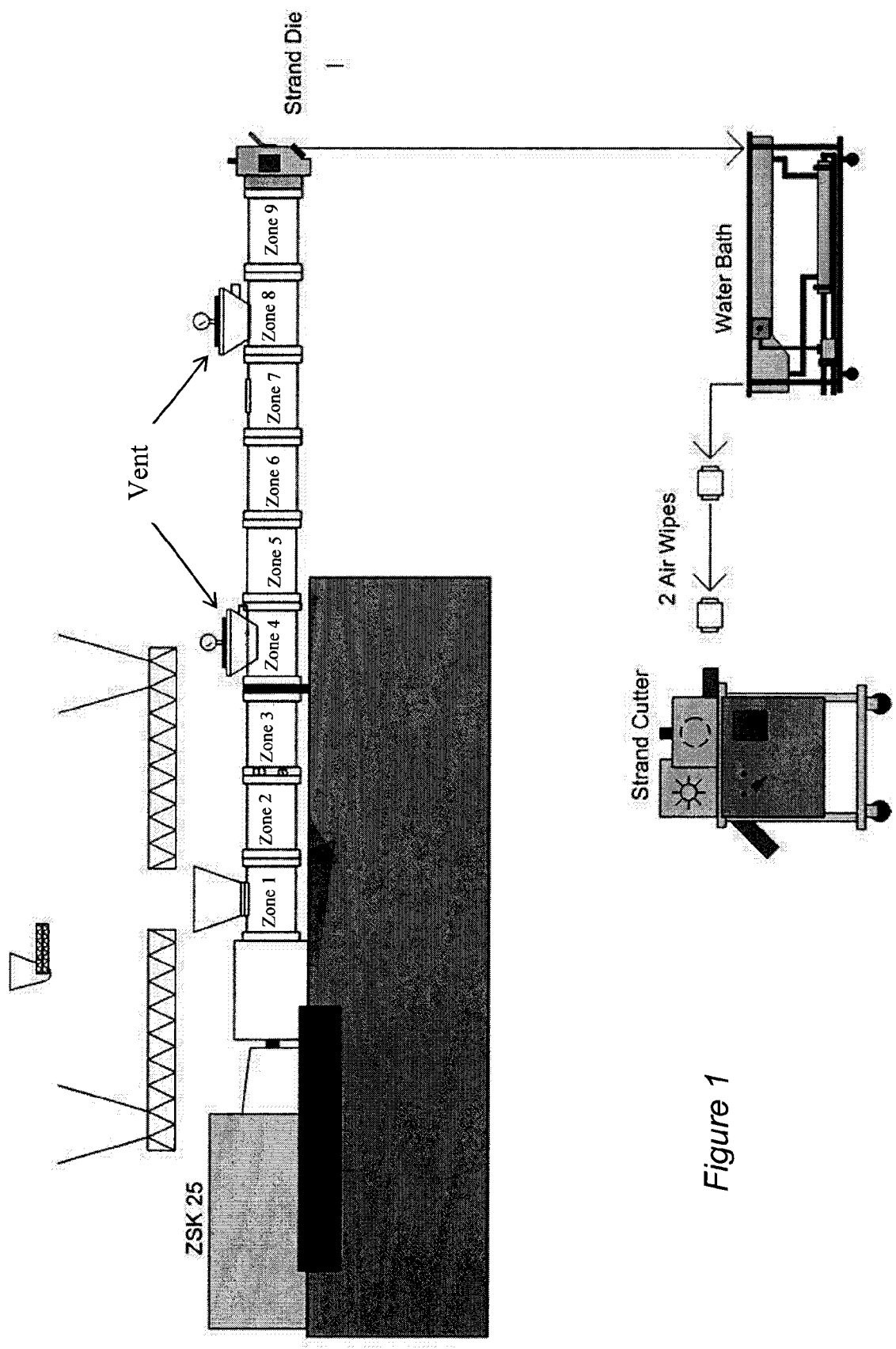
FIG. 1 is a schematic illustration of an extruder arrangement used to compound and pelletize a PLA-containing material for use in a subsequent extrusion process.

The present disclosure provides PLA in combination with additives that are selected such that a desirable level of various properties, particularly those characteristic of improved weatherability (e.g., over PLA alone or PLA and stabilizer), are obtained. Such PLA-containing materials can be prepared through the use of a combination of one or more inorganic pigments and one or more stabilizers that includes one or more carbodiimide functional groups.

As used herein, the terms "weatherable" and "weatherability" refer generally to the ability of a material to resist chemical degradation when subjected to prolonged adverse weathering conditions, in particular elevated temperatures, high humidity, water, and intense sunlight. Such degradation can result in loss of physical integrity, adverse aesthetic changes, and the creation of undesirable reaction products. Depending on the specific material being subjected to such conditions, degradation can produce color changes, gloss changes, chalking, and deterioration of mechanical properties.

Characteristics that typically define weatherability in terms of building products include, for example, color hold, gloss retention, and resistance to chalking. As used herein, color hold is defined as the change in Hunter L,a,b values between an exposed and unexposed test specimen, gloss retention is defined as the gloss change in terms of percent retention between an exposed and unexposed test specimen, and chalking resistance is defined as the ability of the test specimen to resist the formation of a friable powder evolved from the substrate itself at or just beneath the surface. Materials of the present disclosure, and building components containing such material, demonstrate improvement in one or more of these properties compared to, for example, PLA alone or PLA plus stabilizer. Test procedures for color hold, gloss retention, and chalking are described in the Examples Section.

Materials of the present disclosure, and building components containing such material, preferably demonstrate at least one of desirable color hold performance, gloss retention, chalking resistance (more preferably, at least two of these characteristics, and even more preferably all three of these characteristics) over a period of 1 year (more preferably 5 years, and even more preferably 10 years) of South Florida exposure, or simulation of 1 year (more preferably 5 years, and even more preferably 10 years) of South Florida exposure through accelerated weathering.

As used herein, "South Florida exposure" refers to outdoor exposure south of Latitude 27° North at a 45° angle facing south, with no overhangs, eaves, or other blockages present to protect the samples or cast shadows in accordance with ASTM G7-05 and ASTM G147-09. Simulation of such conditions through "accelerated weathering" is described in the Examples Section. An accepted rule of thumb in the coatings industry is that one year of South Florida exposure is equivalent to 1000 hours of accelerated testing. Further information regarding the correlation of 5000 hours of accelerated testing to 5 years of South Florida testing can be found in the article titled "Weathering Testing for the Real World" in *Plastics Technology*, April 2008.

Materials of the present disclosure, and building components containing such material, preferably demonstrate desirable color hold performance over a period of 1 year (more preferably 5 years, and even more preferably 10 years) of South Florida exposure, or simulation of 1 year (more preferably 5 years, and even more preferably 10 years) of South Florida exposure through accelerated weathering. Preferred materials of the present disclosure, and building components containing such material, demonstrate no greater than 5ΔE Units (Hunter) of color change over a period of 1 year under the above-listed conditions (South Florida exposure or simulation thereof through accelerated weathering), which are a common requirement of window and door coating and capping systems. More preferred materials of the present disclosure, and building components containing such material, demonstrate no greater than 5ΔE Units (Hunter) of color change over a period of 5 years under the above-listed conditions (South Florida exposure or simulation thereof through accelerated weathering), which is the color hold requirement found in many window and door product standards such as those from the American Architectural Manufacturers Association, including AAMA 2604, AAMA 614, and AAMA 624. Even more preferred materials of the present disclosure, and building components containing such material, demonstrate no greater than 5ΔE Units (Hunter) of color change over a period of 10 years under the above-listed conditions (South Florida exposure or simulation thereof through accelerated weathering), which is the color hold requirement found in many window and door product standards such as AAMA 2605, AAMA 615, and AAMA 625. Herein, the listed periods of time will be understood to be modified by "at least" (e.g., a period of 1 year means a period of at least 1 year).

In certain embodiments, a PLA-containing material, particularly a building component as described herein that includes PLA, pigment, particularly $TiO_2$ pigment, and stabilizer, particularly comprising one or more carbodiimide groups, are selected to provide a material that demonstrates no greater than 3ΔE Units (Hunter), or no greater than 2ΔE Units (Hunter), or no greater than 1ΔE Units (Hunter), of color change over a period of 5000 hours, or 2500 hours, or 1000 hours, or 500 hours of accelerated weathering.

Materials of the present disclosure, and building components containing such material, preferably demonstrate desirable gloss retention performance over a period of 1 year (more preferably 5 years, and even more preferably 10 years) of South Florida exposure, or simulation of 1 year (more preferably 5 years, and even more preferably 10 years) of South Florida exposure through accelerated weathering. Preferred materials of the present disclosure, and building components containing such material, demonstrate at least 30% gloss retention over the above-listed time periods (1 year, 5 years, or 10 years) and conditions (South Florida exposure or simulation thereof through accelerated weathering). More preferred materials of the present disclosure, and building components containing such material, demonstrate at least 50% gloss retention over the above-listed time periods (1 year, 5 years, or 10 years) and conditions (South Florida exposure or simulation thereof through accelerated weathering).

In certain embodiments, a PLA-containing material, particularly a building component as described herein that includes PLA, pigment, particularly $TiO_2$ pigment, and stabilizer, particularly comprising one or more carbodiimide groups, are selected to provide a material that demonstrates at least 40%, or at least 50%, or at least 60%, or at least 70%, gloss retention over a period of 5000 hours, or 2500 hours, or 1000 hours, or 500 hours accelerated weathering.

Materials of the present disclosure, and building components containing such material, preferably demonstrate desirable chalking resistance performance over a period of 1 year (more preferably 5 years, and even more preferably 10 years) of South Florida exposure, or simulation of 1 year (more preferably 5 years, and even more preferably 10 years) of South Florida exposure through accelerated weathering. Preferred materials of the present disclosure, and building components containing such material, demonstrate no less than a chalking rating of 8 over the above-listed time periods (1 year, 5 years, or 10 years) and conditions (South Florida exposure or simulation thereof through accelerated weathering).

The types and amounts of the additives used to make the materials of the present disclosure, and building components containing such material, can be identified using one or more of these desirable characteristics to achieve varying levels of color hold, gloss retention, and/or chalking resistance.

For example, in certain embodiments, the types and amounts of PLA, pigment, and stabilizer are selected to provide a material, and building component containing such material, that demonstrates no greater than 5ΔE Units (Hunter) of color change, and at least 30% gloss retention, over a period of 5 years of South Florida exposure, or simulation of 5 years of South Florida exposure through accelerated weathering.

As another example, in certain embodiments, the types and amounts of PLA, pigment, and stabilizer are selected to provide a material, and building component containing such material, that demonstrates no greater than 5ΔE Units (Hunter) of color change, at least 30% gloss retention, and a chalking rating of 8 or more, over a period of 5 years of South Florida exposure, or simulation of 5 years of South Florida exposure through accelerated weathering.

As another example, in certain embodiments, the types and amounts of PLA, pigment, and stabilizer are selected to provide a material, and building component containing such material, that demonstrates no greater than 5ΔE Units (Hunter) of color change and at least 50% gloss retention, over a period of 10 years of South Florida exposure, or simulation of 10 years of South Florida exposure through accelerated weathering.

Polylactic acid or polylactide (i.e., polymers of polylactic acid, or PLA) is a thermoplastic aliphatic polyester derived from renewable resources, such as corn starch or sugar canes. PLA is typically produced from the dilactate ester by ring-opening polymerization of a lactide ring. Such polymers are commercially available in a wide range of molecular weights, e.g., with number average molecular weights (Mn) ranging from 50,000 to 111,000, weight average molecular weights (Mw) ranging from 100,000 to 210,000, and polydispersity indices (PDI) of 1.9-2.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity is largely controlled by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book *Poly(Lactic Acid) Synthesis, Structures, Properties, Processing, and Applications*, Wiley Series on Polymer Engineering and Technology, 2010.

Exemplary PLA resins are those offered by Purac Biomaterials of Gorinchem, NL or Futerro of Escanaffles, BE or Natureworks, LLC of Minnetonka, Minn. Of these, those polylactic acids that are particularly preferred include 6202D, 4032D, 6252D, 3001D, 6201D, 7032D, 6400D, and 3251D from Natureworks, LLC.

As used herein, the terms "PLA" or "polylactic acid" refer to one or more such resins (e.g., mixtures of resins).

In certain embodiments, the PLA used in materials of the present disclosure is at least 90% L, based on the total weight of PLA.

Preferably, the amount of polylactic acid in a PLA-containing material of the present disclosure is at least 50 percent by weight (wt-%), more preferably, at least 75 wt-%, and even more preferably, at least 90 wt-%, based on the total weight of the PLA-containing material. Preferably, the amount of polylactic acid in a PLA-containing material of the present disclosure is no greater than 98.9 wt-%, based on the total weight of the PLA-containing material.

The characteristics of a PLA resin (or mixture of resins), particularly with respect to weatherability, can be enhanced by the incorporation of one or more hydrolysis inhibitors (i.e., stabilizers) containing a carbodiimide group. One example of such a material is available under the trade designation STABAXOL I, which is a monomeric carbodiimide made by Rhein Chemie of Chardon, Ohio. Other carbodiimide-containing compounds include those available under the trade designations STABAXOL I LF, which is a monomeric compound containing carbodiimide groups, and STABAXOL P, which is a polymeric material containing carbodiimide groups, both also made by Rhein Chemie.

Other compounds that contain carbodiimide groups and that are known to have stabilizing effects on polyesters are disclosed, for example, in U.S. Pat. Nos. 5,210,170 and 5,614,483, and U.S. patent application Ser. No. 2010/0093888A1. Polymeric materials containing carbodiimide groups that are known to have a stabilizing effect on polyesters are disclosed, for example, in U.S. Pat. No. 6,498,225.

Examples of suitable carbodiimide-containing compounds include mono- and di-carbodiimide compounds such as dicyclohexyl carbodiimide, diisopropyl carbodiimide, dimethyl carbodiimide, diisobutyl carbodiimide, dioctyl carbodiimide, octyldecyl carbodiimide, di-t-butyl carbodiimide, t-butylisopropyl carbodiimide, dibenzyl carbodiimide, diphenyl carbodiimide, N-octadecyl-N'-phenylcarbodiimide, N-benzyl-N'-phenylcarbodiimide, N-benzyl-N'-tolylcarbodiimide, di-o-toluoylcarbodiimide, di-p-toluoylcarbodiimide, bis(p-nitrophenyl)carbodiimide, bis(p-aminophenyl)carbodiimide, bis(p-hydroxyphenyl)carbodiimide, bis(p-chlorophenyl)carbodiimide, bis(o-chlorophenyl)carbodiimide, bis(o-ethylphenyl)carbodiimide, bis(p-ethylphenyl)carbodiimide, bis (o-isopropylphenyl)carbodiimide, bis(p-isopropylphenyl) carbodiimide, bis(o-isobutylphenyl)carbodiimide, bis(p-isobutylphenyl)carbodiimide, bis(2,5-dichlorophenyl) carbodiimide, p-phenylenebis(o-toluoylcarbodiimide), p-phenylenebis(cyclohexylcarbodiimide), p-phenylenebis (p-chlorophenylcarbodiimide), 2,6,2',6'-tetraisopropyldiphenyl carbodiimide, hexamethylenebis(cyclohexylcarbodiimide), ethylenebis(phenylcarbodiimide), ethylenebis (cyclohexylcarbodiimide), bis(2,6-dimethylphenyl) carbodiimide, bis(2,6-diethylphenyl)carbodiimide, bis(2-ethyl-6-isopropylphenyl)carbodiimide, bis(2-butyl-6-isopropylphenyl)carbodiimide, bis(2,6-diisopropylphenyl) carbodiimide, bis(2,6-di-t-butylphenyl)carbodiimide, bis(2,4,6-trimethylphenyl)carbodiimide, bis(2,4,6-triisopropylphenyl)carbodiimide, bis(2,4,6-tributylphenyl) carbodiimide, di-.beta.-naphthylcarbodiimide, N-tolyl-N'-cyclohexylcarbodiimide and N-tolyl-N'-phenylcarbodiimide.

In certain embodiments, bis(2,6-diisopropylphenyl)carbodiimide and 2,6,2',6'-tetraisopropyldiphenylcarbodiimide are preferred from the viewpoints of reactivity and stability. Use of dicyclohexyl carbodiimide or diisopropyl carbodiimide, which can be industrially acquired, is also preferred.

Polycarbodiimides such as poly(1,6-cyclohexanecarbodiimide), poly(4,4'-methylenebiscyclohexylcarbodiimide), poly(1,3-cyclohexylenecarbodiimide), poly(1,4-cyclohexylenecarbodiimide), poly(4,4'-diphenylmethanecarbodiimide), poly(3,3'-dimethyl-4,4'-diphenylmethanecarbodiimide), poly(naphthylenecarbodiimide), poly(p-phenylenecarbodiimide), poly(m-phenylenecarbodiimide), poly(p-tolylcarbodiimide), poly(diisopropylcarbodiimide), poly(methyldiisopropylphenylenecarbodiimide) and poly (triethylphenylenecarbodiimide) may also be used. Commercially available polycarbodiimide compounds include CARBODILITE LA-1 and HMV-8CA (as a tradename of CARBOLITE) marketed from Nisshinbo Industries, Inc.

Various combinations of stabilizers as described herein can be used in the PLA-containing materials of the present disclosure if desired.

In certain embodiments, the amount of one or more stabilizers is preferably at least 0.1 wt-%, more preferably at least 0.5 wt-%, even more preferably at least 0.6 wt-%, even more preferably at least 0.7 wt-%, and even more preferably at least 0.76 wt-%, based on the total weight of the PLA-containing material. In certain embodiments, the amount of one or more stabilizers is preferably no greater than 10 wt-%, more preferably no greater than 5 wt-%, even more preferably no greater than 3.75 wt-%, even more preferably no greater than 3 wt-%, and even more preferably no greater than 2.6 wt-%, based on the total weight of the PLA-containing material.

Also, the weatherability of the PLA can be enhanced by the incorporation of one or more inorganic pigments. Inorganic pigments are typically durable and light-fast when exposed outdoors. They are also desirable because they are generally impervious to sunlight, chemicals, and thermal attack.

Examples of suitable inorganic pigments include metal oxides (including mixed metal oxides), metal sulfides, and metal salts. Examples include titanium dioxide, zinc oxide, zinc sulfide, and antimony oxide. Preferred inorganic pigments are metal oxides. A particularly preferred inorganic pigment is rutile titanium dioxide, in the form of a finely ground powder, which has been shown to be a stable pigment in that it provides opacity for white and white containing colors as well as UV absorption.

In certain embodiments, the pigment, in particular titanium dioxide ($TiO_2$) pigment, includes an alumina-based coating (e.g., alumina- or alumina-silica-coating).

Depending on the desired color of the end product, for example, various combinations of inorganic pigments may be used in the PLA-containing materials of the present disclosure, and building components containing such material.

In certain embodiments, the amount of one or more inorganic pigments is preferably at least 1 wt-%, more preferably at least 3 wt-%, and even more preferably at least 3.75 wt-%, based on the total weight of the PLA-containing material. In certain embodiments, the amount of one or more inorganic pigments is preferably no greater than 20 wt-%, more preferably no greater than 12 wt-%, even more preferably no greater than 7 wt-%, and even more preferably no greater than 6.45 wt-%, based on the total weight of the PLA-containing material.

Materials of the present disclosure can include various optional additives, such as processing aids, heat or UV stabilizers, antioxidants, hindered amine light stabilizers, nucleating agents, and fillers, for example.

As used herein, the term "process aid" or "processing aid" refers to additives for improving the processing of the PLA-containing material. Such additives may include metal release agents, lubricants, viscosity modifiers, additives for improving melt strength in extrusion, as well as other additives. Process aids can function in a variety of ways, sometimes modifying the polymer, and sometimes depositing onto various surfaces that the polymer contacts during processing, or both. In some cases, process aids may function in more than one way, for example as a lubricant and as a metal release agent. Examples of process aids include waxes, stearates, such as calcium stearate, and polymeric materials. It is contemplated that there may be examples wherein satisfactory results may be obtained without one or more of the disclosed additives. Exemplary processing aids include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range form 0 to 20 wt-%, based on the total weight of the PLA-containing material, depending on the melt characteristics of the formulation that is desired.

Nucleating agents can play a significant role in improving the speed and degree of polymer crystallization, if such crystallization is desired. Nucleating agents can be either organic or inorganic, and specific nucleating agents are more suitable than others for particular polymers. Talc, in the form of a finely ground powder, has been found to be a particularly suitable inorganic nucleating agent for PLA. Suitable organic nucleating agents for polyesters include metal salts of aromatic sulphonates, as disclosed in U.S. Pat. Appl. Ser. No. 2007/0270535A1. One particularly useful salt of an aromatic sulphonate is LAK-301, which is commercially available from Takemoto Oil and Fat Co, LTD, of Japan. It is also believed that there may be advantages to using a combination of organic and inorganic nucleating agents to achieve optimal crystallization. If used, a typical amount of one or more nucleating agents is at least 0.1 wt-%, and preferably up to 2 wt-%, based on the total weight of the PLA-containing material.

In certain embodiments, materials are preferably crystallized. Materials with a sufficient level of crystallization have reduced levels of warping, crumbling, flaking, and/or embrittlement.

In certain embodiments, materials of the present disclosure, and building components including such materials, preferably have a desirable level of crystallization, which is evidenced by a heat distortion temperature (HDT) of no less than 80° C.

A common filler material suitable for use in the PLA-containing materials of the present disclosure, if desired, is wood fiber, though other fillers or reinforcing materials may also be used. Wood fiber can be sourced from hardwoods and/or softwoods. Other biomaterials or other organic materials may also be used as fillers. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as fillers. Other biomaterials, including proteinaceous materials such as poultry feathers, may also find application in some instances. Other organic materials, such as carbon black, carbon fiber, and the like may also be used as fillers. Other polymeric materials such as thermosetting materials or composites thereof in particulate pigment form may also find application. In addition, inorganic particulate materials such as metal oxide particles or spheres, glass particles, short glass fibers, or other like materials may be used. These fillers may be used either alone or in combination with other organic or inorganic fillers. Also, the fillers may be treated in various ways to improve adhesion to the polymeric materials, reduce moisture effects, or provide other useful properties. Typical amounts for such fillers can range from 0 to 70 wt-%, based on the total weight of the PLA-containing material.

Materials of the present disclosure can be used in making building components, such as structural and decorative members, that will be exposed to the elements and that need to last extended periods of time under such exposure. Such structural and decorative members may include, for instance, components for windows and doors, railings, decking, siding, flooring, fencing, trim, and other building products. This includes fenestration components such as window and door components (e.g., jambs, sills, frames, rails, stiles, extenders, grilles, trim, mull posts, panels, and other accessories or components, such as capping materials for such components).

The materials of the present disclosure can be formed by known extrusion (including co-extrusion) techniques, compression molding techniques, sheet molding techniques, injection molding techniques, and the like. Extrusion is the process of producing continuous articles by forcing a material through a die. In polymer extrusion, the material being forced through a die is a molten polymer. Profile extrusion refers to the process of making continuous shapes (not including sheet and tubes) by extrusion. The term "profile extrusion" also refers to the resultant article formed during the profile extrusion process. In certain embodiments, the article, which is particularly in the form of a building component, is in the form of a profile extrusion.

In addition, a process called co-extrusion is often employed whereby two or more polymeric materials, each extruded separately, are joined in a molten state in the die. Co-extrusion is a common method for producing lower cost, weatherable articles for building and construction applications. It offers the advantage of utilizing the often expensive weatherable material only at the surface of the article, while utilizing a less expensive base material as the substrate. In these applications, the co-extruded surface layer is called a capping layer (i.e., capstock). In addition, these materials may also be extruded in the form of a capping layer over non-thermoplastic materials such as wood, thermosets, or metal.

The materials disclosed herein can be in the form of a profile that has been formed by an extrusion process (referred to herein as a "profile extrusion"), such as a co-extruded layer or capping material (e.g., over another material such as a wood window or door component). The materials disclosed herein can be in the form of a combination thereof, a compression molded article, a sheet molded article, an injection molded article, and the like.

ILLUSTRATIVE EMBODIMENTS OF THE DISCLOSURE

1. A PLA-containing material comprising:
   polylactic acid (PLA);
   one or more inorganic pigments; and
   one or more stabilizers comprising one or more carbodiimide groups;
   wherein the types and amounts of PLA, pigment, and stabilizer are selected to provide a material that demonstrates no greater than 5ΔE Units (Hunter) of color change over a period of 1 year of South Florida exposure, or simulation of 1 year of South Florida exposure through accelerated weathering.
2. The PLA-containing material of embodiment 1 wherein the types and amounts of PLA, pigment, and stabilizer are selected to provide a material that demonstrates no greater than 5ΔE Units (Hunter) of color change over a period of 5 years of South Florida exposure, or simulation of 5 years of South Florida exposure through accelerated weathering.
3. The PLA-containing material of embodiment 2 wherein the types and amounts of PLA, pigment, and stabilizer are selected to provide a material that demonstrates no greater than 5ΔE Units (Hunter) of color change over a period of 10 years of South Florida exposure, or simulation of 10 years of South Florida exposure through accelerated weathering.

4. The PLA-containing material of any one of the previous embodiments wherein the types and amounts of PLA, pigment, and stabilizer are selected to provide a material that demonstrates at least 30% gloss retention over a period of 1 year of South Florida exposure, or simulation of 1 year of South Florida exposure through accelerated weathering.

5. The PLA-containing material of embodiment 4 wherein the types and amounts of PLA, pigment, and stabilizer are selected to provide a material that demonstrates at least 30% gloss retention over a period of 5 years of South Florida exposure, or simulation of 5 years of South Florida exposure through accelerated weathering.

6. The PLA-containing material of embodiment 5 wherein the types and amounts of PLA, pigment, and stabilizer are selected to provide a material that demonstrates at least 50% gloss retention over a period of 10 years of South Florida exposure, or simulation of 10 years of South Florida exposure through accelerated weathering.

7. The PLA-containing material of any one of the previous embodiments wherein the types and amounts of PLA, pigment, and stabilizer are selected to provide no less than a chalking rating of 8 or more over a period of 1 year of South Florida exposure, or simulation of 1 year of South Florida exposure through accelerated weathering.

8. The PLA-containing material of embodiment 7 wherein the types and amounts of PLA, pigment, and stabilizer are selected to provide no less than a chalking rating of 8 or more over a period of 5 years of South Florida exposure, or simulation of 5 years of South Florida exposure through accelerated weathering.

9. The PLA-containing material of embodiment 8 wherein the types and amounts of PLA, pigment, and stabilizer are selected to provide no less than a chalking rating of 8 or more over a period of 10 years of South Florida exposure, or simulation of 10 years of South Florida exposure through accelerated weathering.

10. The PLA-containing material of embodiment 1 wherein the types and amounts of PLA, pigment, and stabilizer:
    are selected to provide a material that demonstrates no greater than 3ΔE Units (Hunter), or no greater than 2ΔE Units (Hunter), or no greater than 1ΔE Units (Hunter), of color change over a period of 5000 hours, or 2500 hours, or 1000 hours, or 500 hours of accelerated weathering; and/or
    are selected to provide a material that demonstrates at least 40%, or at least 50%, or at least 60%, or at least 70%, gloss retention over a period of 5000 hours, or 2500 hours, or 1000 hours, or 500 hours accelerated weathering.

11. The PLA-containing material of embodiment 2 wherein the types and amounts of PLA, pigment, and stabilizer are selected to provide a material that demonstrates no greater than 5ΔE Units (Hunter) of color change, and at least 30% gloss retention, over a period of 5 years of South Florida exposure, or simulation of 5 years of South Florida exposure through accelerated weathering.

12. The PLA-containing material of embodiment 11 wherein the types and amounts of PLA, pigment, and stabilizer are selected to provide a material that demonstrates no greater than 5ΔE Units (Hunter) of color change, at least 30% gloss retention, and a chalking rating of 8 or more, over a period of 5 years of South Florida exposure, or simulation of 5 years of South Florida exposure through accelerated weathering.

13. The PLA-containing material of embodiment 11 wherein the types and amounts of PLA, pigment, and stabilizer are selected to provide a material that demonstrates no greater than 5ΔE Units (Hunter) of color change, and at least 50% gloss retention, over a period of 10 years of South Florida exposure, or simulation of 10 years of South Florida exposure through accelerated weathering.

14. The PLA-containing material of any one of the previous embodiments wherein the amount of one or more inorganic pigments is at least 1 wt-%, based on the total weight of the PLA-containing material.

15. The PLA-containing material of any one of the previous embodiments wherein the amount of the one or more stabilizers is at least 0.1 wt-%, based on the total weight of the PLA-containing material.

16. A PLA-containing material comprising:
    polylactic acid (PLA);
    at least 1 wt-% of one or more inorganic pigments; and
    at least 0.1 wt-% of one or more stabilizers comprising one or more carbodiimide groups;
    wherein the percentages are based on the total weight of the PLA-containing material.

17. The PLA-containing material of any one of the previous embodiments wherein the amount of the one or more inorganic pigments is at least 3 wt-%, based on the total weight of the PLA-containing material.

18. The PLA-containing material of embodiment 17 wherein the amount of the one or more inorganic pigments is at least 3.75 wt-%, based on the total weight of the PLA-containing material.

19. The PLA-containing material of any one of the previous embodiments wherein the amount of the one or more inorganic pigments is no greater than 20 wt-%, based on the total weight of the PLA-containing material.

20. The PLA-containing material of embodiment 19 wherein the amount of the one or more inorganic pigments is no greater than 12 wt-%, based on the total weight of the PLA-containing material.

21. The PLA-containing material of embodiment 20 wherein the amount of the one or more inorganic pigments is no greater than 6.45 wt-%, based on the total weight of the PLA-containing material.

22. The PLA-containing material of any one of the previous embodiments wherein the amount of the one or more stabilizers is at least 0.5 wt-%, based on the total weight of the PLA-containing material.

23. The PLA-containing material of embodiment 22 wherein the amount of one or more stabilizers is at least 0.76 wt-%, based on the total weight of the PLA-containing material.

24. The PLA-containing material of any one of the previous embodiments wherein the amount of the one or more stabilizers is no greater than 10 wt-%, based on the total weight of the PLA-containing material.

25. The PLA-containing material of embodiment 24 wherein the amount of the one or more stabilizers is no greater than 5 wt-%, based on the total weight of the PLA-containing material.

26. The PLA-containing material of embodiment 25 wherein the amount of the one or more stabilizers is no greater than 2.6 wt-%, based on the total weight of the PLA-containing material.

27. The PLA-containing material of any one of the previous embodiments in the form of a building component.

28. The PLA-containing material of embodiment 27 wherein the building component comprises a fenestration component or a portion thereof.

29. The PLA-containing material of embodiment 28 wherein the fenestration component comprises a window or door component or a capping material for a window or door component.
30. The PLA-containing material of any of the previous embodiments wherein the material is in the form of a profile extrusion.
31. A PLA-containing building component comprising:
    polylactic acid (PLA);
    at least 3 wt-% TiO$_2$ pigment, based on the total weight of the PLA-containing building component; and
    at least 0.5 wt-% of one or more stabilizers comprising one or more carbodiimide groups, based on the total weight of the PLA-containing building component.
32. The PLA-containing building component of embodiment 31 wherein the polylactic acid is at least 90 wt-% L-polylactic acid (PLA), based on the total weight of the PLA.
33. The PLA-containing building component of embodiment 31 or 32 wherein the PLA, TiO$_2$ pigment, and stabilizer are selected to provide a material that demonstrates no greater than 5ΔE Units (Hunter) of color change over a period of 1 year of South Florida exposure, or simulation of 1 year of South Florida exposure through accelerated weathering.
34. The PLA-containing building component of embodiment 33 wherein the PLA, TiO$_2$ pigment, and stabilizer are selected to provide a material that demonstrates no greater than 5ΔE Units (Hunter) of color change over a period of 5 years of South Florida exposure, or simulation of 5 years of South Florida exposure through accelerated weathering.
35. The PLA-containing building component of any one of embodiments 31 through 34 wherein the PLA, TiO$_2$ pigment, and stabilizer are selected to provide a material that demonstrates no greater than 3ΔE Units (Hunter), or no greater than 2ΔE Units (Hunter), or no greater than 1ΔE Units (Hunter), of color change over a period of 5000 hours, or 2500 hours, or 1000 hours, or 500 hours of accelerated weathering.
36. The PLA-containing building component of any one of embodiments 31 through 35 wherein the PLA, TiO$_2$ pigment, and stabilizer are selected to provide a material that demonstrates at least 30% gloss retention over a period of 1 year of South Florida exposure, or simulation of 1 year of South Florida exposure through accelerated weathering.
37. The PLA-containing building component of any one of embodiments 31 through 36 wherein the PLA, TiO$_2$ pigment, and stabilizer are selected to provide a material that demonstrates at least 40%, or at least 50%, or at least 60%, or at least 70%, gloss retention over a period of 5000 hours, or 2500 hours, or 1000 hours, or 500 hours accelerated weathering.
38. The PLA-containing building component of any one of embodiments 31 through 37 wherein the PLA, TiO$_2$ pigment, and stabilizer are selected to provide no less than a chalking rating of 8 or more over a period of 1 year of South Florida exposure, or simulation of 1 year of South Florida exposure through accelerated weathering.
39. The PLA-containing building component of any one of embodiments 31 through 34 wherein the PLA, TiO$_2$ pigment, and stabilizer are selected to provide a material that demonstrates no greater than 5ΔE Units (Hunter) of color change, and at least 30% gloss retention, over a period of 5 years of South Florida exposure, or simulation of 5 years of South Florida exposure through accelerated weathering.
40. The PLA-containing building component of embodiment 39 wherein the PLA, TiO$_2$ pigment, and stabilizer are selected to provide a material that demonstrates no greater than 5ΔE Units (Hunter) of color change, at least 30% gloss retention, and a chalking rating of 8 or more, over a period of 5 years of South Florida exposure, or simulation of 5 years of South Florida exposure through accelerated weathering.
41. The PLA-containing building component of any one of embodiments 31 through 34 wherein the PLA, TiO$_2$ pigment, and stabilizer are selected to provide a material that demonstrates no greater than 5ΔE Units (Hunter) of color change and at least 50% gloss retention, over a period of 10 years of South Florida exposure, or simulation of 10 years of South Florida exposure through accelerated weathering.
42. The PLA-containing building component of any one of embodiments 31 through 41 wherein the amount of TiO$_2$ pigment is no greater than 20 wt-%, based on the total weight of the PLA-containing building component.
43. The PLA-containing building component of any one of embodiments 31 through 42 wherein the amount of the one or more stabilizers is no greater than 10 wt-%, based on the total weight of the PLA-containing building component.
44. The PLA-containing building component of any one of embodiments 31 through 43 wherein the building component comprises a fenestration component or a portion thereof.
45. The PLA-containing building component of embodiment 44 wherein the fenestration component comprises a window or door component or a capping material for a window or door component.
46. The PLA-containing building component of any one of embodiments 31 through 45 which is in the form of a profile extrusion.
47. The PLA-containing building component of any one of embodiments 31 through 46 which is in the form of a capping material.
48. The PLA-containing building component of any one of embodiments 31 through 47 wherein the TiO$_2$ pigment comprises an alumina-based coating.
49. The PLA-containing building component of any one of embodiments 31 through 48 comprising at least 3.75 wt-% TiO$_2$ pigment.
50. The PLA-containing building component of any one of embodiments 31 through 49 comprising no greater than 12 wt-% TiO$_2$ pigment.
51. The PLA-containing building component of any one of embodiments 31 through 50 comprising at least 0.6 wt-% of one or more stabilizers comprising one or more carbodiimide groups.
52. The PLA-containing building component of any one of embodiments 31 through 51 comprising no greater than 3.75 wt-% of one or more stabilizers comprising one or more carbodiimide groups.
53. A PLA-containing building component comprising:
    polylactic acid (PLA);
    3 wt-% to 12 wt-% TiO$_2$ pigment, based on the total weight of the PLA-containing building component; and
    0.5 wt-% to 3.75 wt-% of one or more stabilizers comprising one or more carbodiimide groups, based on the total weight of the PLA-containing building component.
54. The PLA-containing building component of embodiment 53 wherein the PLA, TiO$_2$ pigment, and stabilizer are selected to provide a material that demonstrates no greater than 5ΔE Units (Hunter) of color change over a period of 1 year of South Florida exposure, or simulation of 1 year of South Florida exposure through accelerated weathering.
55. The PLA-containing building component of embodiment 53 wherein the polylactic acid is at least 90 wt-% L-polylactic acid (PLA), based on the total weight of the PLA.

56. A PLA-containing fenestration component comprising:
    polylactic acid (PLA);
    3.75 wt-% to 12 wt-% $TiO_2$ pigment, based on the total weight of the PLA-containing fenestration component; and
    0.6 wt-% to 3.75 wt-% of one or more stabilizers comprising one or more carbodiimide groups, based on the total weight of the PLA-containing fenestration component.
57. The PLA-containing fenestration component of embodiment 56 wherein the PLA, $TiO_2$ pigment, and stabilizer are selected to provide a material that demonstrates no greater than 5ΔE Units (Hunter) of color change over a period of 1 year of South Florida exposure, or simulation of 1 year of South Florida exposure through accelerated weathering.
58. The PLA-containing fenestration component of embodiment 56 wherein the polylactic acid is at least 90 wt-% L-polylactic acid (PLA), based on the total weight of the PLA.
59. A building component comprising a PLA-containing material comprising:
    polylactic acid (PLA);
    $TiO_2$ pigment; and
    one or more stabilizers comprising one or more carbodiimide groups;
    wherein the PLA-containing material includes an amount of $TiO_2$ pigment and one or more stabilizers in an amount within the region RA shown in FIG. 3A.
60. A building component comprising a PLA-containing material comprising:
    polylactic acid (PLA);
    $TiO_2$ pigment; and
    one or more stabilizers comprising one or more carbodiimide groups;
    wherein the PLA-containing material includes an amount of $TiO_2$ pigment and one or more stabilizers in an amount within the region RB shown in FIG. 3B.
61. A building component comprising a PLA-containing material comprising:
    polylactic acid (PLA);
    $TiO_2$ pigment; and
    one or more stabilizers comprising one or more carbodiimide groups;
    wherein the PLA-containing material includes an amount of $TiO_2$ pigment and one or more stabilizers in an amount within the region RC shown in FIG. 3C.
62. The PLA-containing material, building component, or fenestration component of any one of the previous embodiments, having a heat distortion temperature (HDT) of no less than 80° C.

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight. These abbreviations are used in the following examples: g=grams, min=minutes, hr=hour, mL=milliliter, L=liter, ° C.=degrees Celsius, rpm=rotations per minute, cm=centimeter.

Accelerated Weathering

The test samples were exposed to accelerated weathering conditions in an Atlas Ci5000 Xenon Weather-Ometer from Atlas Material Testing Technology, 4114 North Ravenswood Avenue, Chicago, Ill., 60613. Testing was performed according to ASTM G155-05, Standard Practice for Operating Xenon Arc Light Apparatus for Exposure of Non-Metallic Materials, with the customized settings outlined in Appendix A of ASTM G155-05. This includes:

Alternate exposure to light and intermittent exposure to water spray (90 minutes light, 30 minutes light & water spray)

CAM 162 (simulates direct exposure in Miami, Fla.)

Filters: Borosilicate Inner and Borosilicate S Outer

Irradiance: 0.68 $W/m^2$ at 340 nm

Black Panel Temperature: 70° C. (light cycle), 70° C. (light and water cycle)

Dry Bulb Temperature: 43° C. (light cycle), 43° C. (light and water cycle)

Relative Humidity: 55% (light cycle), 90% (light and water cycle)

An accepted rule of thumb in the coatings industry is that one year of South Florida exposure is equivalent to 1000 hours of accelerated testing.

Color

The initial color and subsequent color change after accelerated weathering was measured with a Gretag Macbeth Color-Eye 7000A colorimeter from Gretag Macbeth, 617 Little Britain Road, New Windsor, N.Y., 12553. Color was measured in Hunter L,a,b units and the change in color calculated according to ASTM D2244-02, Standard Practice for Calculation of Color Tolerances and Color Differences from Instrumentally Measured Color Coordinates.

Gloss

Initial gloss and the subsequent gloss retention after accelerated weathering was measured with a BYK micro-TRI-gloss 60 degree gloss meter from BYK Gardner USA, Columbia, Md. Gloss was measured and retention calculated in 60 degree gloss units according to ASTM D523-89, Standard Test Method for Specular Gloss.

Chalking

The amount of chalking after accelerated weathering was obtained according to Test Method C of ASTM D4214-07, Standard Test Methods for Evaluating the Degree of Chalking of Exterior Paint Films, with the test method being used as written except for the tape being applied directly to the material being tested.

Compounding and Pelletizing of Materials Used to Extrude Samples

As used herein, the term "compounding" refers to the process of combining a polymeric material with at least one other ingredient, either polymeric or non-polymeric, at a temperature sufficiently elevated to allow the ingredients to be mixed into a molten mass. Referring to FIG. 1, all components of the formulations were fed into a Werner Pfleiderer ZSK 25 compounder at barrel section Zone 1. The material was then heated in barrel sections Zone 2 and Zone 3 to about 170° C., fed at 450 rpm, and devolatilized through vacuum vent in section Zone 4, resulting in a molten material. The material was further compounded at 165° C. in barrel sections Zones 5-9, from which it fed into a two-hole strand die. The strands were then dropped into a chilled water bath at approximately 8° C. to cool sufficiently to solidify. After the strands exited the water bath they were pulled through two air wipes to remove the water. Then the strands were pulled into a pelletizing strand cutter to create the final pellets at a rate of 30 pounds per hour. These pellets, in turn, were fed to a laboratory scale strip extruder as described below to extrude the sample strips from which specimens were taken for testing.

Extrusion of Sample Strips

Figure 2:
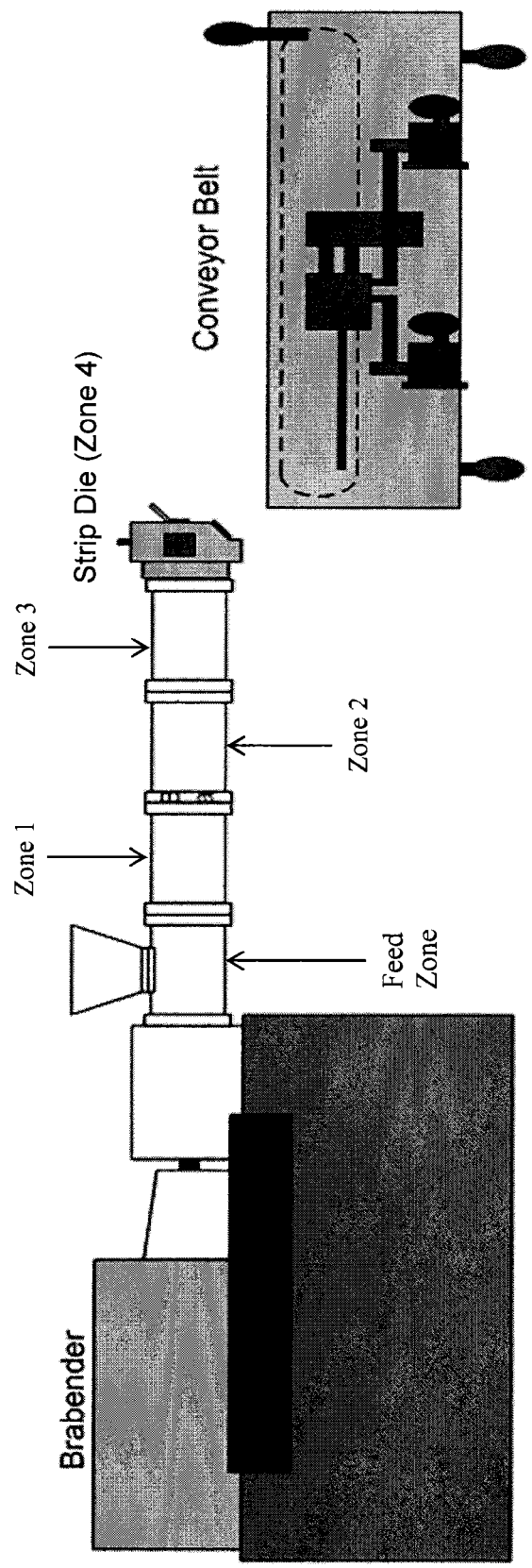
FIG. 2 is a schematic illustration of a laboratory scale extruder arrangement used to produce the extruded members tested according to the disclosure.

The PLA materials, produced as described above, were fed into the extrusion system shown in FIG. 2. The extruder was a laboratory scale Brabender Intelli-Torque Plastic-Corder Torque Rheometer that included a flood fed 3 heat zone barrel with a 1.905 cm (¾ inch), 25:1 length to diameter, single stage mixing screw. The material was then fed to an adjustable strip die with a land length of 2.1209 cm (0.835 inch) and the die opening set at 0.1134 cm (0.045 inch)×7.62 cm (3.00 inch). For all sample strips the pellets were flood fed into the feed zone. The material was then extruded through Zones 1-3 and melted to 168° C. at 60 rpm. The material was then fed into the adjustable strip die set at 175° C. The strips were then fed onto a Dorner Series 121.92 cm (48 inch) conveyor belt, with the belt speed set to match the extruder output. The strips were allowed to cool at ambient conditions, to approximately 20° C.

Example 1

Six different formulations were created combining various levels of PLA, stabilizers, pigments, and other additives to determine the color hold, gloss retention, and chalking performance under accelerated weathering conditions. The components (PLA and additives) used are listed in Table 1a. The formulations are outlined below in Table 1b.

TABLE 1a

| Ingredient | Ingredient | Properties | Product | Vendor |
|---|---|---|---|---|
| Resin | PLA | Mn about 100,000 % D about 2 | 4032D | Natureworks, LLC of Minnetonka, MN |
| Inorganic Pigment | $TiO_2$ | alumina-coated, rutile crystal structure, 97% $TiO_2$ | KR2073 | Kronos |
| Hydrolysis Stabilizer | Substituted di-aryl carbodiimide | N,N'-di (2,6-diisopropylphenyl)-carbodiimide, Minimum 10% carbodiimide content | STABAXOL I | Rhein Chemie |
| Nucleating Agent | micro-crystalline talc | 61% $SiO_2$, 31.1% MgO, 1.7 micron mean particle size | Mistron Vapor R | Luzenac Inc, of Vancouver, BC |
| Crystallization Accelerant | aromatic sulphonate derivative | | LAK-301 | Takemoto Oil & Fat Co. LTD of Japan |
| Process Aids | Calcium Stearate | 160 C. softening point, 85-100% thru 325 mesh | Calcium Stearate F | Chemtura, Inc. of Middlebury, CT |
| | Paraffin, montan and fatty acid ester wax mixture | 98-105 C. drop point by ASTM D3954, 85-92 C. congealing point by ASTM D938 | XL-623 | Amerilubes, LLC of Charlotte, NC |

TABLE 1b

Formulation of Samples 1 through 6

| | wt-% PLA 4032D | wt-% $TiO_2$- rutile | wt-% STABAXOL I | wt-% LAK-301 | wt-% Talc | wt-% XL-623 |
|---|---|---|---|---|---|---|
| Sample 1 | 94.25 | 3.75 | 1.25 | 0.25 | 0.25 | 0.25 |
| Sample 2 | 88.5 | 7.5 | 2.5 | 0.5 | 0.5 | 0.5 |
| Sample 3 | 82.75 | 11.25 | 3.75 | 0.75 | 0.75 | 0.75 |
| Sample 4 | 94.875 | 3.75 | 0.625 | 0.25 | 0.25 | 0.25 |
| Sample 5 | 89.75 | 7.5 | 1.25 | 0.5 | 0.5 | 0.5 |
| Sample 6 | 84.625 | 11.25 | 1.875 | 0.75 | 0.75 | 0.75 |

All samples were then placed in accelerated weathering conditions as described above. Gloss and color measurements were taken at intervals between 250 hours and 5000 hours using the test method specified above. The level of chalking was also measured initially as well as upon completion of the 5000-hour total test cycle.

Additional components (PLA type and additives) used in Examples 4 and 5 are listed in Table 1c.

TABLE 1c

| Ingredient | Ingredient | Properties | Product | Vendor |
|---|---|---|---|---|
| Resin | PLA | Mn about 100,000 % D about 15 | 4060D | Natureworks, LLC of Minnetonka, MN |
| Inorganic Pigments | TiO$_2$ | alumina, silica-coated, rutile crystal structure, 90.5% TiO$_2$ | KR2160 | Kronos of Cranbury, NJ |
| | Beige pigment | Metal oxide mixture with about 66% being TiO$_2$ | Shepherd Brown | Shepherd Color Company, Cincinnati, OH |
| | Green pigment | Metal oxide mixture with 0% being TiO$_2$ | Shepherd Green | Shepherd Color Company, Cincinnati, OH |
| Hydrolysis Stabilizer | Polymeric aromatic carbodiimide | Minimum 12.5% carbodiimide content | STABAXOL P | Rhein Chemie |
| | Aliphatic Polycarbodiimide | | Carbodilite HMV-15CA | Nisshinbo Chemical Inc. |

Tables 2 through 5 show the results of the color hold measurement as measured using the test method specified above.

TABLE 2

Hunter ΔL Units (Light/Dark Color Shift)

| | 250 hr | 1000 hr | 1500 hr | 2000 hr | 3000 hr | 4000 hr | 5000 hr |
|---|---|---|---|---|---|---|---|
| PVC xenon | | −1.02 | | −0.02 | 0.55 | 0.12 | −0.12 |
| Sample 1 | 0.23 | | −0.04 | −0.09 | −0.34 | −0.465 | −0.285 |
| Sample 2 | −0.01 | | −0.21 | −0.26 | −0.475 | −0.66 | −0.52 |
| Sample 3 | 0.00 | | −0.36 | −0.43 | −0.64 | −0.695 | −0.83 |
| Sample 4 | 0.17 | | 0.05 | 0.04 | −0.15 | −0.265 | −0.1 |
| Sample 5 | 0.08 | | 0.04 | 0.04 | −0.23 | −0.27 | 0.07 |
| Sample 6 | 0.09 | | 0.04 | 0.01 | −0.215 | −0.27 | −0.19 |

The PLA formulations experienced very little change in the light/dark color space, and exhibited less variation over time than the PVC control comparison.

TABLE 3

Hunter Δa Units (Red/Green Color Shift)

| | 250 hr | 1000 hr | 1500 hr | 2000 hr | 3000 hr | 4000 hr | 5000 hr |
|---|---|---|---|---|---|---|---|
| PVC xenon | | −0.06 | | 0.08 | 0.24 | 0.37 | 0.36 |
| Sample 1 | −0.01 | | 0.01 | 0.04 | 0.06 | 0.105 | 0.185 |
| Sample 2 | −0.02 | | 0.00 | 0.02 | 0.055 | 0.105 | 0.175 |
| Sample 3 | −0.03 | | 0.00 | 0.05 | 0.095 | 0.14 | 0.21 |
| Sample 4 | 0.03 | | 0.06 | 0.09 | 0.11 | 0.115 | 0.16 |
| Sample 5 | 0.00 | | 0.02 | 0.05 | 0.065 | 0.105 | 0.135 |
| Sample 6 | 0.00 | | 0.00 | 0.03 | 0.045 | 0.06 | 0.1 |

The PLA formulations experienced a slight shift in the red direction of the color space, while the PVC control comparison experienced a larger shift in the red direction of the color space.

TABLE 4

Hunter Δb Units (Yellow-Blue Color Shift)

| | 250 hr | 1000 hr | 1500 hr | 2000 hr | 3000 hr | 4000 hr | 5000 hr |
|---|---|---|---|---|---|---|---|
| PVC xenon | | 1.98 | | 0.58 | −0.28 | 0.23 | 0.33 |
| Sample 1 | −0.57 | | 0.15 | 0.18 | 0.375 | 0.465 | 0.35 |
| Sample 2 | −0.05 | | 0.57 | 0.58 | 0.7 | 0.805 | 0.595 |
| Sample 3 | 0.09 | | 0.94 | 0.95 | 1.035 | 0.945 | 0.835 |
| Sample 4 | −0.72 | | −0.39 | −0.44 | −0.285 | −0.115 | −0.12 |
| Sample 5 | −0.49 | | −0.22 | −0.20 | 0.045 | 0.04 | −0.125 |
| Sample 6 | −0.15 | | 0.23 | 0.21 | 0.45 | 0.525 | 0.41 |

The PLA formulations experienced a slight shift in the yellow direction of the color space, and exhibited less variation over time than the PVC control comparison. Samples 2 and 3, with the highest stabilizer content, exhibited the largest shift.

TABLE 5

Hunter ΔE Units (Overall Color Shift)

| | 250 hr | 1000 hr | 1500 hr | 2000 hr | 3000 hr | 4000 hr | 5000 hr |
|---|---|---|---|---|---|---|---|
| PVC xenon | | 2.228093 | | 0.585833 | 0.66 | 0.45 | 0.50 |
| Sample 1 | 0.62 | | 0.16 | 0.21 | 0.51 | 0.67 | 0.493 |
| Sample 2 | 0.06 | | 0.60 | 0.63 | 0.85 | 1.05 | 0.81 |
| Sample 3 | 0.10 | | 1.01 | 1.04 | 1.22 | 1.18 | 1.2 |
| Sample 4 | 0.73 | | 0.40 | 0.45 | 0.34 | 0.33 | 0.23 |
| Sample 5 | 0.49 | | 0.23 | 0.21 | 0.24 | 0.29 | 0.283 |
| Sample 6 | 0.18 | | 0.24 | 0.21 | 0.5 | 0.595 | 0.464 |

The PLA formulations exhibited less variation over time than the PVC control comparison. Samples 2 and 3, with the highest stabilizer content, exhibited the largest shift.

FIG. 3 illustrates the results of color shift, ΔE, as analyzed as a Response Surface designed experiment in order to obtain the amounts of stabilizer and pigment needed in the formulation to optimize color hold for the samples produced in Example 1.

Table 6 shows the gloss retention of the test samples as measured using the test method specified above.

TABLE 6

Gloss Retention

| | 250 hr | 1000 hr | 1500 hr | 2000 hr | 3000 hr | 4000 hr | 5000 hr |
|---|---|---|---|---|---|---|---|
| PVC xenon | | 0.957143 | | 0.3 | 0.27 | 0.24 | 0.27 |
| Sample 1 | 1.08 | | 0.96 | 1.04 | 0.98 | 0.62 | 0.52 |
| Sample 2 | 0.97 | | 0.93 | 0.87 | 0.82 | 0.65 | 0.51 |

TABLE 6-continued

Gloss Retention

|  | 250 hr | 1000 hr | 1500 hr | 2000 hr | 3000 hr | 4000 hr | 5000 hr |
|---|---|---|---|---|---|---|---|
| Sample 3 | 0.96 |  | 0.76 | 0.53 | 0.5 | 0.34 | 0.28 |
| Sample 4 | 0.93 |  | 0.83 | 0.72 | 0.66 | 0.5 | 0.26 |
| Sample 5 | 0.94 |  | 0.73 | 0.55 | 0.31 | 0.17 | 0.11 |
| Sample 6 | 0.97 |  | 0.60 | 0.24 | 0.03 | 0.4 | 0.03 |

The PLA formulations experienced a slower degree of gloss loss than the PVC control comparison, with the exception of Sample 6.

Table 7 shows the resistance to chalking results of Samples 1-6 as measured using the test method specified above.

TABLE 7

Chalking Resistance

| Sample | Initial Rating | Final Rating |
|---|---|---|
| Sample 1 | 10 | 8 |
| Sample 2 | 10 | 4 |
| Sample 3 | 10 | 4 |
| Sample 4 | 10 | 4 |
| Sample 5 | 10 | 4 |
| Sample 6 | 10 | 4 |

Example 2 (Comparative)

Two formulations were made from PLA and stabilizer only to determine the exact influence of the stabilizer on color hold and gloss retention. The formulations are outlined below in Table 8.

TABLE 8

Formulation of Samples 7 and 8

|  | Wt % PLA-4032D | Wt % Stabaxol P |
|---|---|---|
| Sample 7 | 98.12 | 1.88 |
| Sample 8 | 96.25 | 3.75 |

All samples were then placed in accelerated weathering conditions as described above. Gloss and color measurements were taken at intervals between 250 hours and 500 hours using the test method specified above.

Tables 9 through 12 show the results of the color hold measurement as measured using the test method specified above.

TABLE 9

Hunter ΔL Units (Light/Dark Color Shift)

|  | 250 hrs | 500 hrs |
|---|---|---|
| Sample 7 | −6.11 | −7.19 |
| Sample 8 | −10.10 | −12.3 |

TABLE 10

Hunter Δa Units (Red/Green Color Shift)

|  | 250 hrs | 500 hrs |
|---|---|---|
| Sample 7 | 0.31 | 1.27 |
| Sample 8 | 2.38 | 3.31 |

TABLE 11

Hunter Δb Units (Yellow/Blue Color Shift)

|  | 250 hrs | 500 hrs |
|---|---|---|
| Sample 7 | 17.20 | 19.3 |
| Sample 8 | 23.60 | 23.6 |

TABLE 12

Hunter ΔE Units (Overall Color Shift)

|  | 250 hrs | 500 hrs |
|---|---|---|
| Sample 7 | 18.20 | 20.6 |
| Sample 8 | 25.80 | 26.8 |

Table 13 shows the gloss retention of the test samples as measured using the test method specified above.

TABLE 13

Gloss Retention

|  | 250 hrs | 500 hrs |
|---|---|---|
| Sample 7 | 0.48 | 0.41 |
| Sample 8 | 0.36 | 0.41 |

When compared to the results of Example 1, the results of Example 2 show that the presence of stabilizer in a PLA-containing material, in absence of a pigment, does not provide the desired color hold or gloss retention as to be sufficiently weatherable.

Example 3 (Comparative)

Figure 4:
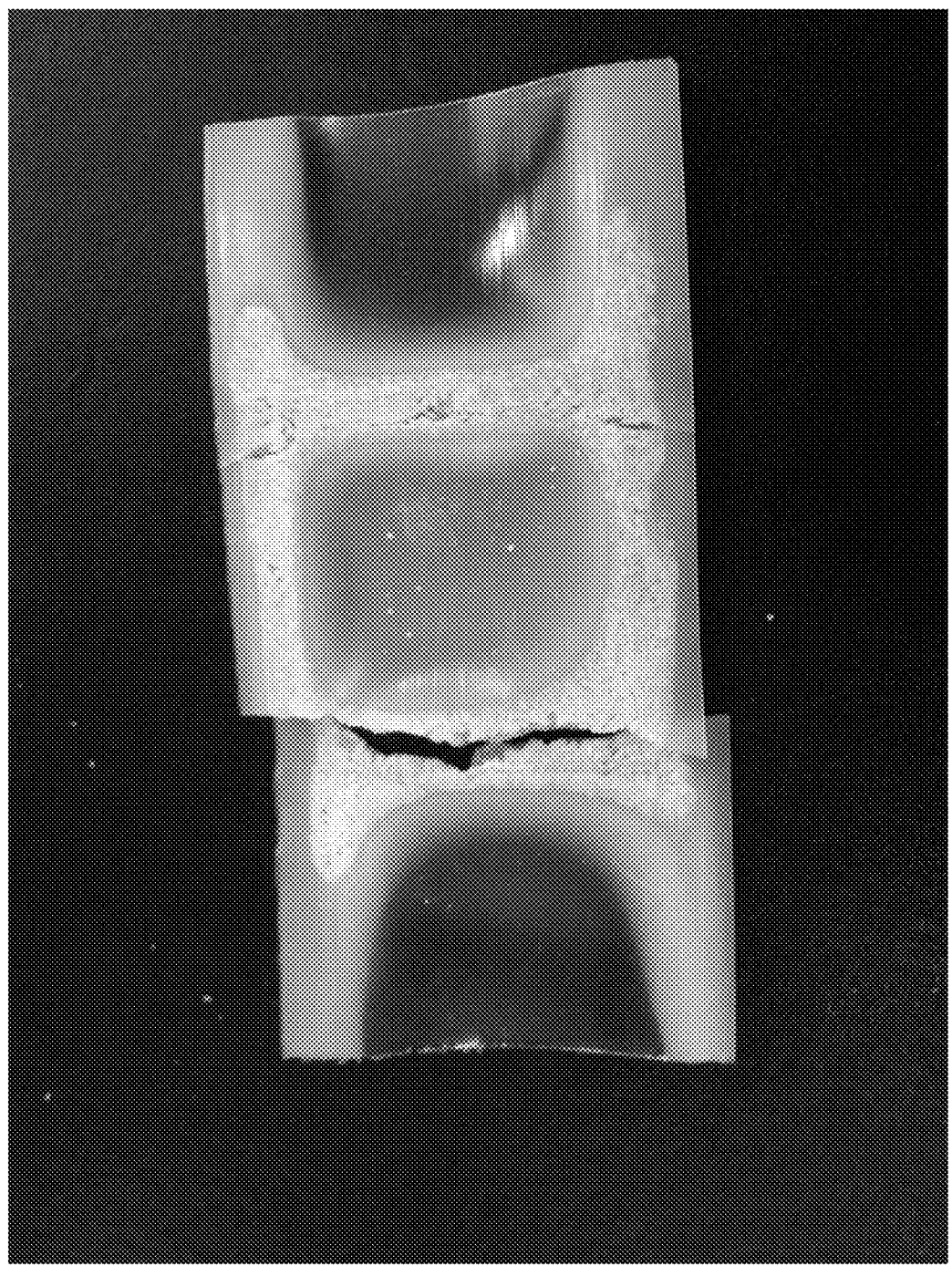
FIG. 4 is a photograph illustrating the degradation seen in Sample 9.

Sample 9 was created out of 100% PLA according to the extrusion process specified above. The parts were then exposed to the accelerated weathering conditions as specified above. FIG. 4 illustrates the complete breakdown of the material after 250 hours of accelerated weathering. Although the part was distorted and inconsistent in color across the exposed area, a color measurement was taken after 250 hours of accelerated exposure. The color reading showed a ΔE (Hunter) of 17.59. Gloss retention and chalking measurements were not able to be taken due to the breakdown of the surface. When compared to the results of Example 3, the results of Example 2 show that the presence of one or more stabilizers improves the weatherability of PLA, however the results of Example 2 still do not exhibit a desired level of weatherability.

The results of the accelerated testing show that PLA, alone, does not exhibit good weatherability characteristics. While adding a hydrolysis stabilizer to the PLA can have a positive affect on the weatherability characteristic of gloss retention, samples using only PLA and hydrolysis stabilizer undergo considerable color change upon weathering. Optimization of the weathering characteristics of color hold, gloss retention, and chalking can be achieved by suitable combinations of PLA, inorganic pigment, and hydrolysis stabilizer.

Examples 4 and 5

In the following test results, it is seen that some samples suffered various types of deterioration or damage in addition to changes in color or changes in gloss. In particular, some samples became warped, while other samples exhibited crumbling, flaking, or embrittlement. When this occurred, the samples were removed from the test chamber in order to avoid the possibility that further deterioration could produce contaminants that might affect the other samples being tested. It is believed that primary contributors to these forms of deterioration were inadequate levels of stabilizer or inadequate crystallization, or both. As discussed in previous co-assigned application U.S. 2012/0220697 A1, a good measure of the level of crystallization in PLA is heat distortion temperature, in that factors that are expected to increase crystallization, such as the presence of nucleating agents and maintaining samples at suitably elevated temperatures for a period of time, also increase heat distortion temperature. Moreover, it is likely that the warping seen in some samples could have been prevented by increased heat distortion temperature. Referring to the test samples in Example 5, it is seen that the samples that underwent severe deterioration were the samples comprising 4060D PLA, which combines a higher ratio of PLA-D to PLA-L, thereby inhibiting crystallization. Heat distortion temperature is defined by the test procedure and apparatus disclosed in U.S. 2012/0220697 A1.

Example 4

In order to demonstrate the color hold and gloss hold characteristics of PLA in colors other than white, the formulations of Table 14 were compounded, extruded, and exposed as described above. Samples were periodically removed from the Weather-Ometer for testing of color, gloss retention, and chalking, and returned for further exposure to the Weather-Ometer conditions, provided they still exhibited physical and dimensional integrity. Results of this testing can be seen in Tables 14A-14E. Samples that became distorted or warped (code "a" in Tables 14A-14E) or that showed flaking, crumbling, or other loss of physical integrity (code "b" in Tables 14A-14E) were removed from further exposure and color testing to avoid the possibility that further deterioration could produce contaminants that might affect the other samples being tested. Additionally, if another failure mode precedes color change, loss of gloss, or chalking, these properties become irrelevant.

Referring to Table 14, Samples 10-12 contained a green pigment comprising various mixed metal oxides that imparts a dark green color to those samples, however, this pigment contained no $TiO_2$. Samples 13-15 contained a beige pigment comprising $TiO_2$ and other mixed metal oxides that imparts a beige color to those samples. Samples 16-21 contained a white pigment comprising only Kronos KR2073 $TiO_2$ which imparts a white color to those samples. Samples 22 and 23 did not contain any pigment. The effects of different colored pigments, as well as the absence of pigment, could thus be demonstrated.

TABLE 14

Formulation of Samples 10 through 23

| Sample No. | PLA 4032D wt-% | White* pigment wt-% | Beige** pigment wt-% | Green*** pigment wt-% | Resulting $TiO_2$ wt-% | STABAXOL P wt-% | LAK-301 wt-% | Talc wt-% | Ca Stearate wt-% | XL623 wt-% |
|---|---|---|---|---|---|---|---|---|---|---|
| 10 | 88.0  | 0.0   | 0.0   | 10.0 | 0.0   | 0.0  | 1.0  | 1.0  | 0.0  | 0.0  |
| 11 | 86.12 | 0.0   | 0.0   | 10.0 | 0.0   | 1.88 | 1.0  | 1.0  | 0.0  | 0.0  |
| 12 | 84.25 | 0.0   | 0.0   | 10.0 | 0.0   | 3.75 | 1.0  | 1.0  | 0.0  | 0.0  |
| 13 | 88.0  | 0.0   | 10.0  | 0.0  | 6.6   | 0.0  | 1.0  | 1.0  | 0.0  | 0.0  |
| 14 | 85.86 | 0.0   | 10.19 | 0.0  | 6.73  | 1.92 | 1.02 | 1.02 | 0.0  | 0.0  |
| 15 | 84.82 | 0.0   | 9.64  | 0.0  | 6.36  | 3.61 | 0.96 | 0.96 | 0.0  | 0.0  |
| 16 | 86.27 | 9.8   | 0.0   | 0.0  | 9.8   | 0.0  | 0.98 | 0.98 | 0.98 | 0.98 |
| 17 | 84.71 | 9.63  | 0.0   | 0.0  | 9.63  | 1.81 | 0.96 | 0.96 | 0.96 | 0.96 |
| 18 | 83.22 | 9.46  | 0.0   | 0.0  | 9.46  | 3.55 | 0.95 | 0.95 | 0.95 | 0.95 |
| 19 | 88.11 | 10.01 | 0.0   | 0.0  | 10.01 | 1.88 | 0.0  | 0.0  | 0.0  | 0.0  |
| 20 | 86.38 | 9.82  | 0.0   | 0.0  | 9.92  | 1.85 | 0.0  | 0.0  | 0.98 | 0.98 |
| 21 | 86.38 | 9.82  | 0.0   | 0.0  | 9.82  | 1.85 | 0.98 | 0.98 | 0.0  | 0.0  |
| 22 | 97.91 | 0.0   | 0.0   | 0.0  | 0.0   | 2.09 | 0.0  | 0.0  | 0.0  | 0.0  |
| 23 | 95.91 | 0.0   | 0.0   | 0.0  | 0.0   | 4.09 | 0.0  | 0.0  | 0.0  | 0.0  |

Samples 10-13, 16, and 22-23 are Comparatives
*White pigment is 100% Kronos KR2073 $TiO_2$
**Beige pigment contains 66% $TiO_2$ to achieve the desired color.
***Green pigment contains no $TiO_2$ Referring to Table 14A, and considering the green pigment samples (Samples 10, 11, and 12), it is seen that the time to failure due to physical disintegration can be extended by increasing the amount of STABAXOL present. Similarly, the beige pigment samples (Samples 13, 14, and 15) also exhibited increasing times to failure with increasing STABAXOL. Likewise, white pigment Sample 16, which contained no STABAXOL, survived only 2000 hours of Weather-Ometer exposure. Looking at white pigment Samples 16-18, it appears that higher levels of STABAXOL also tend to increase the time to failure. Samples 22 and 23, which contained no pigments, exhibited relatively short times to failure, although the absence of nucleating agents may also shorten the time to failure (e.g., as in Example 19). It is also worth noting that even though beige pigment Samples 14 and 15 survived for 5000 hours, the lightening of color, as exhibited by Hunter ΔL units, is significant, compared to white Sample 21, which also survived 5000 hours.

TABLE 14A

Hunter ΔL Units (Light/Dark Color Shift)

| Sample No. | 250 hr | 500 hr | 1000 hr | 2000 hr | 2500 hr | 3000 hr | 4500 hr | 5000 hr |
|---|---|---|---|---|---|---|---|---|
| 10 | −0.21 | −0.20 | b | b | b | b | b | b |
| 11 | 0.28 | 0.58 | 1.06 | 5.15 | b | b | b | b |
| 12 | −0.21 | −0.26 | 1.64 | 7.77 | 17.28 | 14.5 | b | b |
| 13 | 0.03 | 0.03 | 0.04 | 0.03 | b | b | b | b |
| 14 | 0.01 | 0.06 | 0.14 | 0.51 | 0.84 | 1.47 | 1.86 | 3.59 |
| 15 | −0.03 | 0.01 | 0.3 | 0.57 | 0.97 | 1.31 | 3.73 | 5.81 |
| 16 | 0.87 | 0.85 | 1.11 | 1.40 | b | b | b | b |
| 17 | 0.99 | 1.13 | 1.01 | 1.43 | 1.18 | 1.08 | b | b |
| 18 | −0.21 | −0.17 | −0.27 | −0.13 | −0.24 | −0.16 | −0.16 | 0.11 |
| 19 | −0.08 | −0.43 | a | a | a | a | a | a |
| 20 | −0.11 | 0.41 | 0.98 | 0.32 | 0.66 | 0.22 | 0.33 | b |
| 21 | 0.06 | 0.02 | −0.16 | −0.04 | 0.05 | −0.04 | 0.02 | 0.26 |
| 22 | −6.11 | −7.19 | −10.42 | b | b | b | b | b |
| 23 | −10.13 | −12.33 | −16.96 | b | b | b | b | b | a Samples were removed from test due to warping or other dimensional failures.
b Samples were removed from test due to crumbling, flaking, embrittlement, or other loss of physical integrity.

Referring to Table 14B, it is seen that the red/green color shift for the samples that survived 5000 hours is below 1.0, a color shift which might go unnoticed. Sample 21 exhibited significantly less red/green color shift at 5000 hours than did Sample 18, which had a higher level of STABAXOL. Similarly, referring to Table 14C, Sample 21 also exhibited a lower yellow/blue color shift, again corresponding to a lower level of STABAXOL. Finally, referring to Table 14D, Sample 21 exhibited a lower Hunter ΔE, or overall color shift, than did Sample 18. It is therefore apparent that lower STABAXOL levels correspond to lower color shifts due to weathering. Thus, there is a balance of properties that needs to be considered when selecting the level of stabilizer (and pigment) in a material of the present disclosure. Also, Sample 19, which did not include a nucleating agent, was less desirable than those samples that did include a nucleating agent, and, hence, greater crystallization. However, greater crystallization is not a necessary requirement to obtain good weatherability as both Samples 19 and 20 possessed an HDT of less than 60° C.

TABLE 14B

Hunter Δa Units (Red/Green Color Shift)

| Sample No. | 250 hr | 500 hr | 1000 hr | 2000 hr | 2500 hr | 3000 hr | 4500 hr | 5000 hr |
|---|---|---|---|---|---|---|---|---|
| 10 | −0.16 | −0.16 | b | b | b | b | b | b |
| 11 | −0.18 | −0.22 | −0.26 | −0.72 | b | b | b | b |
| 12 | −0.29 | −0.40 | −0.58 | −1.32 | −0.67 | −1.63 | b | b |
| 13 | 0.02 | 0.02 | 0.03 | 0.01 | b | b | b | b |
| 14 | 0.00 | −0.01 | 0.01 | −0.04 | −0.05 | −0.11 | 0.06 | −0.35 |
| 15 | −0.01 | −0.02 | 0.00 | −0.05 | −0.03 | −0.07 | −0.08 | 0.97 |
| 16 | 0.08 | 0.06 | 0.08 | 0.05 | b | b | b | b |
| 17 | 0.01 | −0.01 | 0.03 | 0.03 | 0.06 | 0.06 | b | b |
| 18 | −0.15 | −0.10 | 0.04 | 0.12 | 0.17 | 0.19 | 0.19 | 0.20 |
| 19 | −0.25 | −0.19 | a | a | a | a | a | a |
| 20 | −0.03 | −0.03 | 0.03 | 0.03 | 0.08 | 0.06 | 0.08 | b |
| 21 | −0.30 | −0.23 | −0.06 | 0.08 | 0.13 | 0.13 | 0.15 | 0.08 |
| 22 | 0.31 | 1.27 | 4.38 | b | b | b | b | b |
| 23 | 2.88 | 3.31 | 5.92 | b | b | b | b | b | a Samples were removed from test due to warping or other dimensional failures.
b Samples were removed from test due to crumbling, flaking, embrittlement, or other loss of physical integrity.

TABLE 14C

Hunter Δb Units (Yellow/Blue Color Shift)

| Sample No. | 250 hr | 500 hr | 1000 hr | 2000 hr | 2500 hr | 3000 hr | 4500 hr | 5000 hr |
|---|---|---|---|---|---|---|---|---|
| 10 | 0.10 | 0.05 | b | b | b | b | b | b |
| 11 | 0.41 | 0.89 | 0.42 | 0.00 | b | b | b | b |
| 12 | 0.91 | 0.86 | 0.81 | 0.24 | −0.97 | 0.36 | b | b |
| 13 | −0.07 | −0.13 | −0.11 | −0.15 | b | b | b | b |
| 14 | 0.01 | −0.10 | −0.15 | −0.28 | −0.34 | −0.39 | −1.21 | −1.11 |
| 15 | 0.24 | 0.10 | −0.01 | −0.01 | −0.17 | −0.18 | −1.02 | −1.61 |
| 16 | −0.71 | −0.71 | −0.67 | −0.57 | b | b | b | b |
| 17 | −0.31 | −0.27 | −0.26 | −0.31 | −0.24 | −0.26 | b | b |
| 18 | 1.05 | 1.32 | 1.29 | 0.97 | 0.98 | 0.83 | 0.83 | 0.39 |
| 19 | 1.01 | 1.21 | a | a | a | a | a | a |
| 20 | −0.18 | −0.12 | −0.16 | −0.21 | −0.28 | −0.25 | −0.17 | b |
| 21 | 1.16 | 1.28 | 1.28 | 0.71 | 0.5 | 0.42 | 0.14 | −0.12 |
| 22 | 17.16 | 19.27 | 19.91 | b | b | b | b | b |
| 23 | 23.57 | 23.57 | 23.48 | b | b | b | b | b | a Samples were removed from test due to warping or other dimensional failures.
b Samples were removed from test due to crumbling, flaking, embrittlement, or other loss of physical integrity.

TABLE 14D

Hunter ΔE Units (Overall Color Shift)

| Sample No. | 250 hr | 500 hr | 1000 hr | 2000 hr | 2500 hr | 3000 hr | 4500 hr | 5000 hr |
|---|---|---|---|---|---|---|---|---|
| 10 | 0.29 | 0.29 | b | b | b | b | b | b |
| 11 | 0.53 | 0.77 | 1.17 | 5.2 | b | b | b | b |
| 12 | 1.54 | 1.19 | 2.10 | 7.88 | 17.85 | 14.6 | b | b |
| 13 | 0.08 | 0.13 | 0.12 | 0.15 | b | b | b | b |
| 14 | 0.09 | 0.14 | 0.22 | 0.58 | 0.91 | 1.52 | 1.96 | 3.78 |
| 15 | 0.29 | 0.22 | 0.26 | 0.58 | 0.99 | 1.32 | 3.87 | 6.04 |
| 16 | 1.13 | 1.11 | 1.30 | 1.51 | b | b | b | b |
| 17 | 1.04 | 1.11 | 1.04 | 1.46 | 1.21 | 1.11 | b | b |
| 18 | 1.08 | 1.33 | 1.32 | 0.99 | 1.03 | 0.87 | 0.87 | 0.96 |
| 19 | 1.04 | 1.32 | a | a | a | a | a | a |
| 20 | 0.23 | 0.45 | 0.52 | 0.38 | 0.65 | 0.34 | 0.38 | b |
| 21 | 1.2 | 1.30 | 1.29 | 0.72 | 0.52 | 0.44 | 0.40 | 0.22 |
| 22 | 18.23 | 20.61 | 22.35 | b | b | b | b | b |
| 23 | 25.27 | 26.80 | 29.29 | b | b | b | b | b | a Samples were removed from test due to warping or other dimensional failures.
b Samples were removed from test due to crumbling, flaking, embrittlement, or other loss of physical integrity.

TABLE 14E

Gloss Retention

| Sample No. | 250 hr | 500 hr | 1000 hr | 2000 hr | 2500 hr | 3000 hr | 4500 hr | 5000 hr |
|---|---|---|---|---|---|---|---|---|
| 10 | 0.73 | 0.72 | b | b | b | b | b | b |
| 11 | 0.96 | 1.02 | 0.71 | 0.68 | b | b | b | b |
| 12 | 0.59 | 0.64 | 0.56 | 0.22 | 0.11 | 0.01 | b | b |
| 13 | 1.00 | 0.95 | 0.92 | 0.94 | b | b | b | b |
| 14 | 0.90 | 0.95 | 0.69 | 0.72 | 0.99 | 0.21 | 0.43 | 0.22 |
| 15 | 1.01 | 0.72 | 0.55 | 0.62 | 0.98 | 0.39 | 0.32 | 0.23 |
| 16 | 0.84 | 0.88 | 0.72 | 1.06 | b | b | b | b |
| 17 | 0.83 | 1.04 | 1.02 | 1.00 | 1.24 | 0.63 | b | b |
| 18 | 0.50 | 0.89 | 0.69 | 0.57 | 0.50 | 0.41 | 0.41 | 0.13 |
| 19 | 0.50 | 0.78 | a | a | a | a | a | a |
| 20 | 0.94 | 0.88 | 0.78 | 0.66 | 0.83 | 0.62 | 0.26 | b |
| 21 | 0.86 | 0.95 | 0.89 | 0.75 | 0.92 | 0.34 | 0.31 | 0.22 |
| 22 | 0.98 | 0.41 | 0.40 | b | b | b | b | b |
| 23 | 0.37 | 0.41 | 0.33 | b | b | b | b | b | a Samples were removed from test due to warping or other dimensional failures.
b Samples were removed from test due to crumbling, flaking, embrittlement, or other loss of physical integrity.

Example 5

In order to demonstrate the effects of carbodiimide chemistry and concentration, pigment concentration, pigment coating, and PLA resin type on color hold and gloss hold characteristics of PLA, the samples of Tables 15-4032D and 15-4060D were compounded, extruded and exposed as described above. All of the samples in this example used one of two different grades of $TiO_2$ as the pigment, and one of two different stabilizers, STABAXOL and CARBODILITE. All of the samples also contained the same quantity and type of nucleating agents, LAK-301 and talc. PLA 4060D (Samples 40-55) was specifically chosen for this study because of it is an amorphous version of PLA and does not crystallize. Even so, after profile extrusion, all samples (Samples 24 through 55) were treated at a temperature of 96° C. (205° F.) for a time of 20 minutes, then cooled to room temperature before Weather-Ometer exposure. These heating and subsequent cooling steps ensured the samples were crystallized if they could be crystallized. Referring to Table 15B, it is seen that Samples 40-55, which used the 4060D PLA, survived to less than 2500 hours in the Weather-Ometer, compared to at least 4250 hours for the 4032D. As seen in Table 15D, the overall color change, as measured in Hunter ΔE units, after 4250 hours of testing is well below the industry standard of a maximum of 5 Hunter ΔE, and in most cases below 2 Hunter ΔE. Referring to Table 15E, after 4250 hours of testing it is seen that gloss retention is above the industry standard threshold of 0.3 (30%) for many samples, and above 0.4 (40%) for some samples.

TABLE 15-4032D

Formulation of Samples 24-39

|  | wt-% PLA 4032D | wt-% PLA 4060D | wt-% $TiO_2$ 2073 | wt-% $TiO_2$ 2160 | wt-% STABAXOL P | wt-% CARBODILITE | wt-% LAK-301 | wt-% Talc |
| --- | --- | --- | --- | --- | --- | --- | --- | --- |
| Sample 24 | 92.5 | 0.0 | 5.0 | 0.0 | 0.5 | 0.0 | 1.0 | 1.0 |
| Sample 25 | 91.5 | 0.0 | 5.0 | 0.0 | 1.5 | 0.0 | 1.0 | 1.0 |
| Sample 26 | 92.5 | 0.0 | 5.0 | 0.0 | 0.0 | 0.5 | 1.0 | 1.0 |
| Sample 27 | 91.5 | 0.0 | 5.0 | 0.0 | 0.0 | 1.5 | 1.0 | 1.0 |
| Sample 28 | 92.5 | 0.0 | 0.0 | 5.0 | 0.5 | 0.0 | 1.0 | 1.0 |
| Sample 29 | 91.5 | 0.0 | 0.0 | 5.0 | 1.5 | 0.0 | 1.0 | 1.0 |
| Sample 30 | 92.5 | 0.0 | 0.0 | 5.0 | 0.0 | 0.5 | 1.0 | 1.0 |
| Sample 31 | 91.5 | 0.0 | 0.0 | 5.0 | 0.0 | 1.5 | 1.0 | 1.0 |
| Sample 32 | 87.5 | 0.0 | 10.0 | 0.0 | 0.5 | 0.0 | 1.0 | 1.0 |
| Sample 33 | 86.5 | 0.0 | 10.0 | 0.0 | 1.5 | 0.0 | 1.0 | 1.0 |
| Sample 34 | 87.5 | 0.0 | 10.0 | 0.0 | 0.0 | 0.5 | 1.0 | 1.0 |
| Sample 35 | 86.5 | 0.0 | 10.0 | 0.0 | 0.0 | 1.5 | 1.0 | 1.0 |
| Sample 36 | 87.5 | 0.0 | 0.0 | 10.0 | 0.5 | 0.0 | 1.0 | 1.0 |
| Sample 37 | 86.5 | 0.0 | 0.0 | 10.0 | 1.5 | 0.0 | 1.0 | 1.0 |
| Sample 38 | 87.5 | 0.0 | 0.0 | 10.0 | 0.0 | 0.5 | 1.0 | 1.0 |
| Sample 39 | 86.5 | 0.0 | 0.0 | 10.0 | 0.0 | 1.5 | 1.0 | 1.0 |

TABLE 15-4060D

Formulation of Samples 40-55

|  | wt-% PLA 4032D | wt-% PLA 4060D | wt-% $TiO_2$ 2073 | wt-% $TiO_2$ 2160 | wt-% STABAXOL P | wt-% Carbodilite | wt-% LAK-301 | wt-% Talc |
| --- | --- | --- | --- | --- | --- | --- | --- | --- |
| Sample 40 | 0.0 | 92.5 | 5.0 | 0.0 | 0.5 | 0.0 | 1.0 | 1.0 |
| Sample 41 | 0.0 | 91.5 | 0.0 | 5.0 | 0.5 | 0.0 | 1.0 | 1.0 |
| Sample 42 | 0.0 | 92.5 | 10.0 | 0.0 | 0.5 | 0.0 | 1.0 | 1.0 |
| Sample 43 | 0.0 | 91.5 | 0.0 | 10.0 | 0.5 | 0.0 | 1.0 | 1.0 |
| Sample 44 | 0.0 | 92.5 | 5.0 | 0.0 | 1.5 | 0.0 | 1.0 | 1.0 |
| Sample 45 | 0.0 | 91.5 | 0.0 | 5.0 | 1.5 | 0.0 | 1.0 | 1.0 |
| Sample 46 | 0.0 | 92.5 | 10.0 | 0.0 | 1.5 | 0.0 | 1.0 | 1.0 |
| Sample 47 | 0.0 | 91.5 | 0.0 | 10.0 | 1.5 | 0.0 | 1.0 | 1.0 |
| Sample 48 | 0.0 | 92.5 | 5.0 | 0.0 | 0.0 | 0.5 | 1.0 | 1.0 |
| Sample 49 | 0.0 | 92.5 | 0.0 | 5.0 | 0.0 | 0.5 | 1.0 | 1.0 |
| Sample 50 | 0.0 | 87.5 | 10.0 | 0.0 | 0.0 | 0.5 | 1.0 | 1.0 |
| Sample 51 | 0.0 | 87.5 | 0.0 | 10.0 | 0.0 | 0.5 | 1.0 | 1.0 |
| Sample 52 | 0.0 | 91.5 | 5.0 | 0.0 | 0.0 | 1.5 | 1.0 | 1.0 |
| Sample 53 | 0.0 | 91.5 | 0.0 | 5.0 | 0.0 | 1.5 | 1.0 | 1.0 |
| Sample 54 | 0.0 | 86.5 | 10.0 | 0.0 | 0.0 | 1.5 | 1.0 | 1.0 |
| Sample 55 | 0.0 | 86.5 | 0.0 | 10.0 | 0.0 | 1.5 | 1.0 | 1.0 |

TABLE 15A

Hunter ΔL Units (Light/Dark Color Shift)

| Sample No. | 500 hr | 1000 hr | 2500 hr | 3000 hr | 3750 hr | 4250 hr |
|---|---|---|---|---|---|---|
| 24 | −0.09 | −0.14 | −0.18 | −0.06 | −0.14 | 0 |
| 25 | −0.6 | −0.79 | −0.85 | −0.75 | −0.77 | −0.72 |
| 26 | 0.45 | 0.39 | 0.2 | 0.31 | 0.31 | 0.2 |
| 27 | 0.66 | 0.66 | 0.41 | 0.5 | 0.5 | 0.37 |
| 28 | −0.22 | −0.26 | −0.28 | −0.11 | −0.1 | −0.05 |
| 29 | −0.76 | −0.97 | −1.04 | −0.88 | −0.81 | −0.67 |
| 30 | 0.38 | 0.36 | 0.18 | 0.22 | −0.13 | 0.21 |
| 31 | 0.48 | 0.49 | 0.29 | 0.29 | 0.22 | 0.18 |
| 32 | 0.07 | 0.12 | 0.09 | 0.11 | 0.14 | 0.13 |
| 33 | −0.34 | −0.51 | −0.47 | −0.43 | −0.41 | −0.3 |
| 34 | 0.33 | 0.34 | 0.22 | 0.27 | 0.23 | 0.25 |
| 35 | 0.42 | 0.33 | 0.19 | 0.35 | 0.26 | 0.3 |
| 36 | −0.1 | −0.06 | −0.22 | −0.1 | −0.1 | −0.1 |
| 37 | −0.55 | −0.63 | −0.71 | −0.57 | −0.65 | −0.53 |
| 38 | 0.22 | 0.25 | 0.01 | 0.05 | 0.01 | −0.03 |
| 39 | 0.41 | 0.35 | 0.16 | 0.28 | 0.15 | 0.11 |
| 40 | 0.24 | −0.29 | a | b | b | b |
| 41 | 0.98 | 0.65 | a | b | b | b |
| 42 | 0.6 | 0.36 | a | b | b | b |
| 43 | 0.44 | 0.29 | a | b | b | b |
| 44 | −0.33 | −0.81 | a | b | b | b |
| 45 | 0.07 | −0.45 | a | b | b | b |
| 46 | 0.27 | −0.24 | a | a | a | a |
| 47 | 0.17 | −0.21 | a | a | a | a |
| 48 | 0.72 | 0.54 | a | b | b | b |
| 49 | 0.72 | 0.6 | a | b | b | b |
| 50 | 0.58 | a | a | a | a | a |
| 51 | 0.11 | a | a | a | a | a |
| 52 | 0.87 | 0.66 | a | a | a | a |
| 53 | 0.61 | 0.51 | a | a | a | a |
| 54 | 0.51 | 0.44 | a | a | a | a |
| 55 | 0.38 | 0.37 | a | a | a | a | a Samples were removed from test due to warping or other dimensional failures.
b Samples were removed from test due to crumbling, flaking, embrittlement, or other loss of physical integrity.

TABLE 15B

Hunter Δa Units (Red/Green Color Shift)

| Sample No. | 500 hr | 1000 hr | 2500 hr | 3000 hr | 3750 hr | 4250 hr |
|---|---|---|---|---|---|---|
| 24 | 0.1 | 0.09 | 0.16 | 0.11 | 0.16 | 0.22 |
| 25 | −0.13 | 0.07 | 0.36 | 0.27 | 0.34 | 0.39 |
| 26 | 0.05 | 0.05 | 0.1 | 0.07 | 0.07 | 0.16 |
| 27 | 0.23 | 0.18 | 0.24 | 0.2 | 0.2 | 0.28 |
| 28 | 0.18 | 0.17 | 0.23 | 0.16 | 0.22 | 0.27 |
| 29 | 0.11 | 0.28 | 0.51 | 0.39 | 0.47 | 0.5 |
| 30 | 0.1 | 0.09 | 0.14 | 0.11 | 0.06 | 0.2 |
| 31 | 0.19 | 0.17 | 0.2 | 0.16 | 0.21 | 0.26 |
| 32 | 0.09 | 0.06 | 0.1 | 0.07 | 0.12 | 0.18 |
| 33 | −0.11 | 0.05 | 0.23 | 0.18 | 0.22 | 0.27 |
| 34 | 0.07 | 0.05 | 0.06 | 0.06 | 0.1 | 0.15 |
| 35 | 0.17 | 0.13 | 0.18 | 0.15 | 0.19 | 0.23 |
| 36 | 0.23 | 0.2 | 0.25 | 0.21 | 0.25 | 0.26 |
| 37 | 0.13 | 0.25 | 0.42 | 0.34 | 0.39 | 0.43 |
| 38 | 0.12 | 0.08 | 0.11 | 0.09 | 0.13 | 0.18 |
| 39 | 0.15 | 0.16 | 0.14 | 0.11 | 0.16 | 0.13 |
| 40 | −0.06 | −0.03 | a | b | b | b |
| 41 | −0.01 | 0.04 | a | b | b | b |
| 42 | −0.02 | 0.01 | a | b | b | b |
| 43 | 0.06 | 0.07 | a | b | b | b |
| 44 | −0.18 | 0.09 | a | b | b | b |
| 45 | −0.12 | 0.19 | a | b | b | b |
| 46 | −0.12 | 0.08 | a | a | a | a |
| 47 | 0.01 | 0.2 | a | a | a | a |
| 48 | 0.1 | 0.08 | a | b | b | b |
| 49 | 0.13 | 0.11 | a | b | b | b |
| 50 | 0.08 | a | a | a | a | a |
| 51 | 0.08 | a | a | a | a | a |
| 52 | 0.13 | 0.12 | a | a | a | a |
| 53 | 0.14 | 0.12 | a | a | a | a |

TABLE 15B-continued

Hunter Δa Units (Red/Green Color Shift)

| Sample No. | 500 hr | 1000 hr | 2500 hr | 3000 hr | 3750 hr | 4250 hr |
|---|---|---|---|---|---|---|
| 54 | 0.13 | 0.1 | a | a | a | a |
| 55 | 0.12 | 0.1 | a | a | a | a | a Samples were removed from test due to warping or other dimensional failures.
b Samples were removed from test due to crumbling, flaking, embrittlement, or other loss of physical integrity.

TABLE 15C

Hunter Δb Units (Yellow/Blue Color Shift)

| Sample No. | 500 hr | 1000 hr | 2500 hr | 3000 hr | 3750 hr | 4250 hr |
|---|---|---|---|---|---|---|
| 24 | 0.16 | 0.18 | 0.17 | 0.03 | −0.09 | −0.09 |
| 25 | 1.89 | 1.69 | 1.07 | 0.8 | 0.61 | 0.58 |
| 26 | −1.11 | −1.18 | −1.18 | −1.34 | −1.34 | −1.28 |
| 27 | −1.85 | −1.84 | −1.71 | −1.83 | −1.83 | −1.69 |
| 28 | 0.11 | 0.1 | −0.02 | −0.16 | −0.31 | −0.3 |
| 29 | 1.73 | 1.58 | 0.88 | 0.6 | 0.43 | 0.32 |
| 30 | −0.98 | −0.97 | −0.84 | −0.97 | −0.01 | −0.91 |
| 31 | −1.71 | −1.71 | −1.49 | −1.61 | −1.57 | −1.47 |
| 32 | −0.04 | 0.03 | 0.08 | −0.04 | −0.13 | −0.11 |
| 33 | 1.37 | 1.31 | 0.7 | 0.49 | 0.27 | 0.22 |
| 34 | −1 | −1.02 | −0.91 | −1.04 | −1.08 | −1.03 |
| 35 | −1.47 | −1.37 | −1.33 | −1.45 | −1.48 | −1.39 |
| 36 | −0.11 | −0.1 | −0.01 | −0.23 | −0.29 | −0.31 |
| 37 | 1.49 | 1.25 | 0.78 | 0.53 | 0.34 | 0.31 |
| 38 | −0.9 | −0.82 | −0.62 | −0.76 | −0.76 | −0.68 |
| 39 | −1.08 | −1.02 | −0.83 | −0.94 | −0.94 | −0.96 |
| 40 | −0.15 | 0.39 | a | b | b | b |
| 41 | −0.11 | 0.13 | a | b | b | b |
| 42 | −0.19 | −0.12 | a | b | b | b |
| 43 | −0.23 | −0.11 | a | b | b | b |
| 44 | 1.73 | 1.82 | a | b | b | b |
| 45 | 2.26 | 2.25 | a | b | b | b |
| 46 | 1.3 | 1.43 | a | a | a | a |
| 47 | 1.54 | 1.6 | a | a | a | a |
| 48 | −1.47 | −1.41 | a | b | b | b |
| 49 | −1.47 | −1.37 | a | b | b | b |
| 50 | −1.07 | a | a | a | a | a |
| 51 | −1.04 | a | a | a | a | a |
| 52 | −1.78 | −1.71 | a | a | a | a |
| 53 | −1.74 | −1.69 | a | a | a | a |
| 54 | −1.36 | −1.31 | a | a | a | a |
| 55 | −1.23 | −1.21 | a | a | a | a | a Samples were removed from test due to warping or other dimensional failures
b Samples were removed from test due to crumbling, flaking, embrittlement, or other loss of physical integrity.

TABLE 15D

Hunter ΔE Units (Overall Color Shift)

| Sample No. | 500 hr | 1000 hr | 2500 hr | 3000 hr | 3750 hr | 4250 hr |
|---|---|---|---|---|---|---|
| 24 | 0.21 | 0.25 | 0.29 | 0.13 | 0.23 | 0.24 |
| 25 | 1.99 | 1.87 | 1.41 | 1.13 | 1.04 | 1.00 |
| 26 | 1.20 | 1.24 | 1.20 | 1.38 | 1.38 | 1.31 |
| 27 | 1.98 | 1.96 | 1.77 | 1.91 | 1.91 | 1.75 |
| 28 | 0.30 | 0.33 | 0.36 | 0.25 | 0.39 | 0.41 |
| 29 | 1.89 | 1.88 | 1.45 | 1.13 | 1.03 | 0.90 |
| 30 | 1.06 | 1.04 | 0.87 | 1.00 | 0.14 | 0.96 |
| 31 | 1.79 | 1.79 | 1.53 | 1.64 | 1.60 | 1.50 |
| 32 | 0.12 | 0.14 | 0.16 | 0.14 | 0.23 | 0.25 |
| 33 | 1.42 | 1.41 | 0.87 | 0.68 | 0.54 | 0.46 |
| 34 | 1.06 | 1.08 | 0.94 | 1.08 | 1.11 | 1.07 |
| 35 | 1.54 | 1.42 | 1.36 | 1.50 | 1.51 | 1.44 |
| 36 | 0.27 | 0.23 | 0.33 | 0.33 | 0.40 | 0.45 |
| 37 | 1.59 | 1.42 | 1.14 | 0.85 | 0.83 | 0.75 |
| 38 | 0.93 | 0.86 | 0.63 | 0.74 | 0.77 | 0.70 |

TABLE 15D-continued

Hunter ΔE Units (Overall Color Shift)

| Sample No. | 500 hr | 1000 hr | 2500 hr | 3000 hr | 3750 hr | 4250 hr |
|---|---|---|---|---|---|---|
| 39 | 1.16 | 1.09 | 0.86 | 0.99 | 0.97 | 0.98 |
| 40 | 0.29 | 0.49 | a | b | b | b |
| 41 | 0.99 | 0.66 | a | b | b | b |
| 42 | 0.63 | 0.38 | a | b | b | b |
| 43 | 0.50 | 0.32 | a | b | b | b |
| 44 | 1.77 | 1.99 | a | b | b | b |
| 45 | 2.26 | 2.30 | a | b | b | b |
| 46 | 1.33 | 1.45 | a | a | a | a |
| 47 | 1.55 | 1.63 | a | a | a | a |
| 48 | 1.64 | 1.51 | a | b | b | b |
| 49 | 1.64 | 1.50 | a | b | b | b |
| 50 | 1.22 | a | a | a | a | a |
| 51 | 1.05 | a | a | a | a | a |
| 52 | 1.99 | 1.84 | a | a | a | a |
| 53 | 1.85 | 1.77 | a | a | a | a |
| 54 | 1.46 | 1.39 | a | a | a | a |
| 55 | 1.29 | 1.27 | a | a | a | a | a Samples were removed from test due to warping or other dimensional failures.
b Samples were removed from test due to crumbling, flaking, embrittlement, or other loss of physical integrity.

TABLE 15E

Gloss Retention

| Sample No. | 500 hr | 1000 hr | 2500 hr | 3000 hr | 3750 hr | 4250 hr |
|---|---|---|---|---|---|---|
| 24 | 1.6 | 0.5 | 0.5 | 0.4 | 0.3 | 0.2 |
| 25 | 1.5 | 0.4 | 0.6 | 0.6 | 0.4 | 0.5 |
| 26 | 1.5 | 0.3 | 0.6 | 0.6 | 0.4 | 0.4 |
| 27 | 1.6 | 0.2 | 0.6 | 0.7 | 0.4 | 0.6 |
| 28 | 1.5 | 0.9 | 0.4 | 0.4 | 0.1 | 0.2 |
| 29 | 1.5 | 0.8 | 0.5 | 0.5 | 0.3 | 0.3 |
| 30 | 1.5 | 0.9 | 0.7 | 0.7 | 0.7 | 0.6 |
| 31 | 1.5 | 0.8 | 0.6 | 0.6 | 0.6 | 0.6 |
| 32 | 1.6 | 0.9 | 0.6 | 0.5 | 0.3 | 0.3 |
| 33 | 1.5 | 0.9 | 0.6 | 0.5 | 0.3 | 0.4 |
| 34 | 1.4 | 0.5 | 0.6 | 0.5 | 0.2 | 0.2 |
| 35 | 1.6 | 0.7 | 0.4 | 0.3 | 0.2 | 0.2 |
| 36 | 1.5 | 0.5 | 0.5 | 0.5 | 0.4 | 0.4 |
| 37 | 1.5 | 0.5 | 0.5 | 0.5 | 0.4 | 0.4 |
| 38 | 1.6 | 0.7 | 0.6 | 0.6 | 0.5 | 0.5 |
| 39 | 1.6 | 0.5 | 0.5 | 0.7 | 0.3 | 0.3 |
| 40 | 2.6 | 2.0 | a | b | b | b |

TABLE 15E-continued

Gloss Retention

| Sample No. | 500 hr | 1000 hr | 2500 hr | 3000 hr | 3750 hr | 4250 hr |
|---|---|---|---|---|---|---|
| 41 | 1.5 | 0.9 | a | b | b | b |
| 42 | 1.3 | 0.7 | a | b | b | b |
| 43 | 1.5 | 0.8 | a | b | b | b |
| 44 | 1.4 | 1.0 | a | b | b | b |
| 45 | 1.5 | 0.9 | a | b | b | b |
| 46 | 0.8 | 0.7 | a | a | a | a |
| 47 | 1.3 | 0.8 | a | a | a | a |
| 48 | 1.4 | 0.9 | a | b | b | b |
| 49 | 1.4 | 0.5 | a | b | b | b |
| 50 | 1.7 | a | a | a | a | a |
| 51 | 0.7 | a | a | a | a | a |
| 52 | 1.5 | 0.6 | a | a | a | a |
| 53 | 1.4 | 0.7 | a | a | a | a |
| 54 | 1.4 | 0.6 | a | a | a | a |
| 55 | 1.6 | 0.7 | a | a | a | a | a Samples were removed from test due to warping or other dimensional failures.
b Samples were removed from test due to crumbling, flaking, embrittlement, or other loss of physical integrity.

Modeling of Color Change and Gloss Retention

The relationship between $TiO_2$ content (Table 1b), STABAXOL content (Table 1b) and measured color change (Hunter ΔE) and Gloss Retention of Tables 5 and 6 can be fit to a mathematical model in order to estimate the Hunter ΔE and Gloss Retention at other $TiO_2$ and STABAXOL contents. To assist in this effort, the software Design Expert 8.0 from Stat-Ease Inc. Minneapolis, Minn. was used.

For instance, the relationship between percent $TiO_2$ and percent STABAXOL and Hunter ΔE at 250 hours was found to best fit an equation of the form (Equation 1):

$$(\Delta E)^2 = A + B(\% \text{ TiO}_2) + C(\% \text{ STABAXOL}) + D(\% \text{ TiO}_2)^2 + E(\% \text{ STABAXOL})^2 + F(\% \text{ TiO}_2)(\% \text{ STABAXOL})$$

where: A=1.06373
B=−0.086727
C=−0.42687
D=0
E=0
F=0.035917

The $R^2$ for the fit of the data to this equation is 0.9895.

Similarly, the Hunter ΔE (Delta E) and Gloss Retention of all intervals of Tables 5 and 6 were fit to equations of the form of Equation 1, having coefficients as specified in Table 16.

TABLE 16

Equation 1 Coefficients for Delta E and Gloss Retention data as a function of Percent $TiO_2$ and Percent STABAXOL

| Response | A | B | C | D | E | F | $R^2$ |
|---|---|---|---|---|---|---|---|
| (250 Hour Delta E)$^2$ | 1.063733 | −0.08673 | −0.42687 | 0 | 0 | 0.035917 | 0.9895 |
| (1500 Hour Delta E)$^2$ | 0.19335 | 0.053329 | −0.43378 | −0.0136 | 0 | 0.084863 | 0.9807 |
| (2000 Hour Delta E)$^2$ | 0.270625 | 0.043533 | −0.46301 | −0.01403 | 0 | 0.091084 | 0.984 |
| (3000 Hour Delta E)$^2$ | 0.31289 | −0.1155 | 0.172308 | 0 | 0 | 0.04361 | 0.9864 |
| (4000 Hour Delta E)$^2$ | −0.02468 | −0.07332 | 0.61948 | 0 | 0 | 0 | 0.9223 |
| 5000 Hour Delta E | 0.107362 | −0.03806 | 0.404649 | 0 | 0 | 0 | 0.9556 |
| 250 Hour Gloss Retention | — | — | — | — | — | — | 0 |
| 1500 Hour Gloss Retention | 1.01625 | −0.0574 | 0.115206 | 0 | 0 | 0 | 0.6614 |
| 2000 Hour Gloss Retention | 0.794879 | −0.07792 | 0.505582 | 0 | 0 | −0.0305 | 0.9526 |
| 3000 Hour Gloss Retention | 1.1111 | −0.15204 | 0.311527 | 0 | 0 | 0 | 0.9198 |
| 4000 Hour Gloss Retention | 0.756928 | −0.10581 | 0.226475 | 0 | 0 | 0 | 0.8692 |

TABLE 16-continued

Equation 1 Coefficients for Delta E and Gloss Retention data as a function of Percent TiO$_2$ and Percent STABAXOL

| Response | A | B | C | D | E | F | R$^2$ |
|---|---|---|---|---|---|---|---|
| 5000 Hour Gloss Retention | 0.412161 | −0.15098 | 0.621688 | 0.008365 | 0 | −0.04323 | 0.9545 |

Note that a useful model could not be derived for the Gloss Retention at 250 hours (R$^2$ = 0.000).

A color change of less than 1 Hunter Δ E units is desirable for many building component applications. In addition, a gloss retention of at least 0.3 (30%) and no more than 1.1 (110%), assures that a building component does not become too dissimilar in gloss as compared with surrounding materials as the weathering process progresses. With the equations for Hunter ΔE and Gloss Retention as a function of percent TiO$_2$ and percent STABAXOL defined, the Design Expert 8.0 software was also used to identify all combinations of these two additives resulting in preferred compositions, with the following characteristics:

Hunter ΔE no greater than 1 for all intervals from 250 hours to 5000 hours and a gloss retention value of 0.3-1.1 (30% to 110%) for all intervals from 1500 hours to 5000 hours.

Figure 3A:
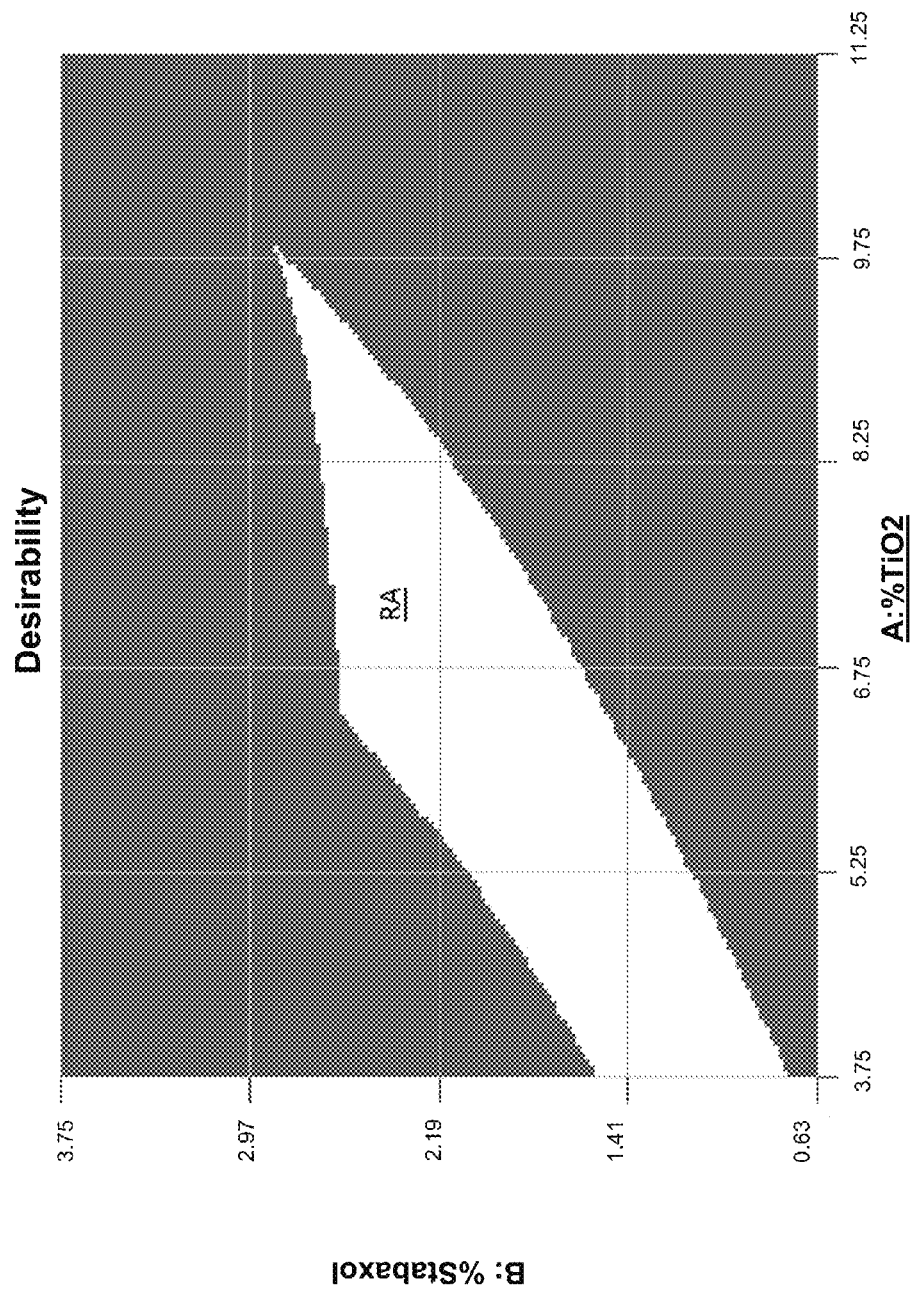
FIG. 3A is a graphical representation of the optimized formulation space as is output by the data in Example 1 when analyzed as a response surface designed experiment (Design Expert Software, Factor Coding Actual Desirability).
Figure 3B:
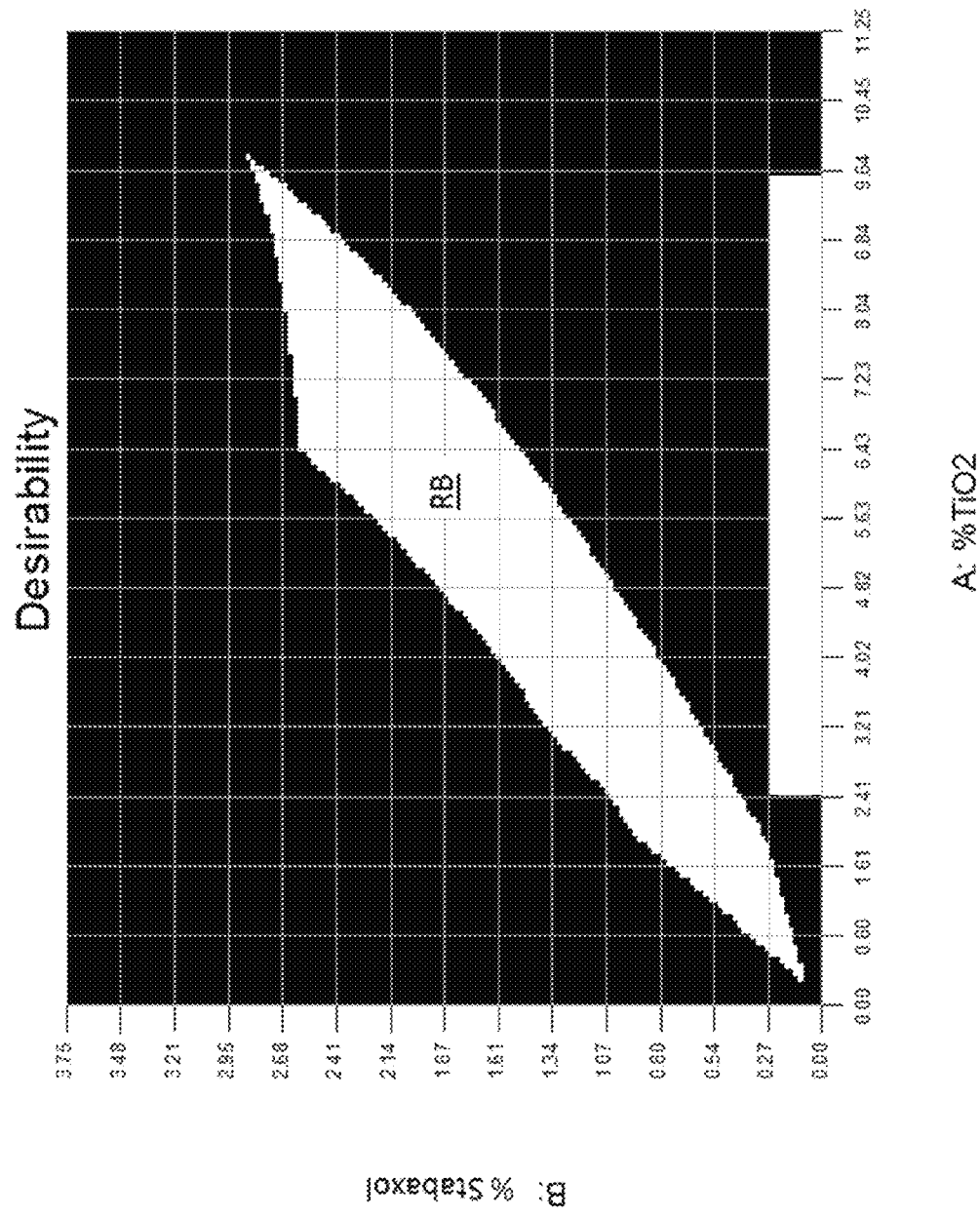
FIG. 3B is a graphical representation of the optimized formulation space including additional space extrapolated beyond the data in Example 1 (represented in FIG. 3A) when analyzed as a response surface designed experiment.
Figure 3C:
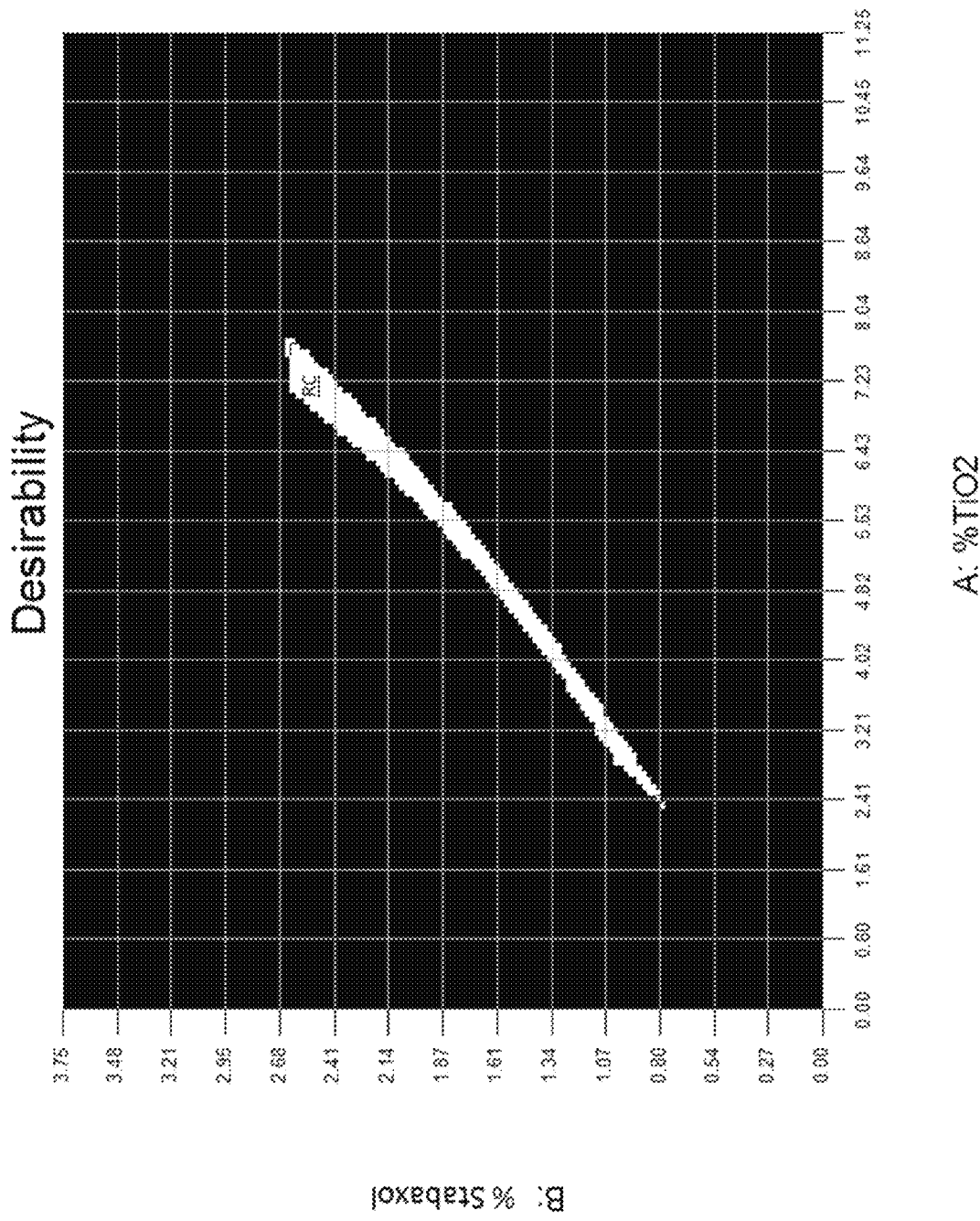
FIG. 3C is a graphical representation of the optimized formulation space including additional space extrapolated beyond the data in Example 1 (represented in FIG. 3A) when analyzed as a response surface designed experiment with additional constraints on gloss retention.

The percent TiO$_2$ and percent STABAXOL corresponding to these conditions are depicted by the area labeled RA of FIG. 3A. In FIG. 3B, the area RB represents the percent TiO$_2$ and percent STABAXOL levels corresponding to the same conditions as FIG. 3A except that the axes representing percent TiO$_2$ and percent STABAXOL are extrapolated to levels lower than measured by the data produced in Tables 5 and 6. These regions define TiO$_2$ content as low as 0.4% and STABAXOL content as low as 0.1% as well as TiO$_2$ contents as high as 9.8% and STABAXOL contents as high as 2.9%. In FIG. 3C, the area RC represents the percent TiO$_2$ and percent STABAXOL levels corresponding to Hunter ΔE no greater than 1 for all intervals from 250 hours to 5000 hours and a gloss retention value of 0.5-1.0 (50% to 100%) for all intervals from 1500 hours to 5000 hours. This region defines TiO$_2$ content as low as 2.2% and STABAXOL content as low as 0.7% as well as TiO$_2$ contents as high as 7.7% and STABAXOL contents as high as 2.6%.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A PLA-containing building component comprising:
polylactic acid (PLA);
at least 3 wt-% TiO$_2$ pigment, based on the total weight of the PLA-containing building component; and
at least 0.5 wt-% of one or more stabilizers comprising one or more carbodiimide groups, based on the total weight of the PLA-containing building components;
wherein the building component comprises a fenestration component or a portion thereof.

2. The PLA-containing building component of claim 1 wherein the polylactic acid is at least 90 wt-% L-polylactic acid (PLA), based on the total weight of the PLA.

3. The PLA-containing building component of claim 1 wherein the PLA, TiO$_2$ pigment, and stabilizer are selected to provide a material that demonstrates no greater than 5ΔE Units (Hunter) of color change over a period of 1 year of South Florida exposure, or simulation of 1 year of South Florida exposure through accelerated weathering.

4. The PLA-containing building component of claim 3 wherein the PLA, TiO$_2$ pigment, and stabilizer are selected to provide a material that demonstrates at least 30% gloss retention over a period of 1 year of South Florida exposure, or simulation of 1 year of South Florida exposure through accelerated weathering.

5. The PLA-containing building component of claim 3 wherein the PLA, TiO$_2$ pigment, and stabilizer are selected to provide no less than a chalking rating of 8 or more over a period of 1 year of South Florida exposure, or simulation of 1 year of South Florida exposure through accelerated weathering.

6. The PLA-containing building component of claim 3 wherein the PLA, TiO$_2$ pigment, and stabilizer are selected to provide a material that demonstrates no greater than 5ΔE Units (Hunter) of color change over a period of 5 years of South Florida exposure, or simulation of 5 years of South Florida exposure through accelerated weathering.

7. The PLA-containing building component of claim 6 wherein the PLA, TiO$_2$ pigment, and stabilizer are selected to provide a material that demonstrates no greater than 5ΔE Units (Hunter) of color change, and at least 30% gloss retention, over a period of 5 years of South Florida exposure, or simulation of 5 years of South Florida exposure through accelerated weathering.

8. The PLA-containing building component of claim 7 wherein the PLA, TiO$_2$ pigment, and stabilizer are selected to provide a material that demonstrates no greater than 5ΔE Units (Hunter) of color change, at least 30% gloss retention, and a chalking rating of 8 or more, over a period of 5 years of South Florida exposure, or simulation of 5 years of South Florida exposure through accelerated weathering.

9. The PLA-containing building component of claim 7 wherein the PLA, TiO$_2$ pigment, and stabilizer are selected to provide a material that demonstrates no greater than 5ΔE Units (Hunter) of color change and at least 50% gloss retention, over a period of 10 years of South Florida exposure, or simulation of 10 years of South Florida exposure through accelerated weathering.

10. The PLA-containing building component of claim 1 wherein the amount of TiO$_2$ pigment is no greater than 20 wt-%, based on the total weight of the PLA-containing building component.

11. The PLA-containing building component of claim 1 wherein the amount of the one or more stabilizers is no greater than 10 wt-%, based on the total weight of the PLA-containing building component.

12. The PLA-containing building component of claim 1 wherein the fenestration component comprises a window or door component or a capping material for a window or door component.

13. The PLA-containing building component of claim 1 which is in the form of a profile extrusion.

14. The PLA-containing building component of claim 1 which is in the form of a capping material.

15. The PLA-containing building component of claim 1 wherein the $TiO_2$ pigment comprises an alumina-based coating.

16. The PLA-containing building component of claim 1 comprising at least 3.75 wt-% $TiO_2$ pigment.

17. The PLA-containing building component of claim 1 comprising no greater than 12 wt-% $TiO_2$ pigment.

18. The PLA-containing building component of claim 1 comprising at least 0.6 wt-% of one or more stabilizers comprising one or more carbodiimide groups.

19. The PLA-containing building component of claim 1 comprising no greater than 3.75 wt-% of one or more stabilizers comprising one or more carbodiimide groups.

20. A PLA-containing building component comprising:
    polylactic acid (PLA);
    3 wt-% to 12 wt-% $TiO_2$ pigment, based on the total weight of the PLA-containing building component; and
    0.5 wt-% to 3.75 wt-% of one or more stabilizers comprising one or more carbodiimide groups, based on the total weight of the PLA-containing building component;
    wherein the building component comprises a fenestration component or a portion Thereof.

21. The PLA-containing building component of claim 20 wherein the PLA, $TiO_2$ pigment, and stabilizer are selected to provide a material that demonstrates no greater than 5ΔE Units (Hunter) of color change over a period of 1 year of South Florida exposure, or simulation of 1 year of South Florida exposure through accelerated weathering.

22. The PLA-containing building component of claim 20 wherein the polylactic acid is at least 90 wt-% L-polylactic acid (PLA), based on the total weight of the PLA.

23. A PLA-containing fenestration component comprising:
    polylactic acid (PLA);
    3.75 wt-% to 12 wt-% $TiO_2$ pigment, based on the total weight of the PLA-containing fenestration component; and
    0.6 wt-% to 3.75 wt-% of one or more stabilizers comprising one or more carbodiimide groups, based on the total weight of the PLA-containing fenestration component.

24. The PLA-containing fenestration component of claim 23 wherein the PLA, $TiO_2$ pigment, and stabilizer are selected to provide a material that demonstrates no greater than 5ΔE Units (Hunter) of color change over a period of 1 year of South Florida exposure, or simulation of 1 year of South Florida exposure through accelerated weathering.

25. The PLA-containing fenestration component of claim 24 wherein the polylactic acid is at least 90 wt-% L-polylactic acid (PLA), based on the total weight of the PLA.

26. The PLA-containing fenestration of claim 24 having a heat distortion temperature (HDT) of no less than 80° C.

27. A building component comprising a PLA-containing material comprising:
    polylactic acid (PLA);
    $TiO_2$ pigment; and
    one or more stabilizers comprising one or more carbodiimide groups;
    wherein the PLA-containing material includes an amount of $TiO_2$ pigment and one or more stabilizers in an amount within the region RB shown in FIG. 3B;
    wherein the building component comprises a fenestration component or a portion thereof.

28. The building component of claim 1 wherein the PLA-containing component further comprises a filler.

29. The building component of claim 28 wherein the filler comprises wood fiber.

30. The building component of claim 20 wherein the PLA-containing component further comprises a filler.

31. The building component of claim 30 wherein the filler comprises wood fiber.

* * * * *

UNITED STATES PATENT AND TRADEMARK OFFICE
CERTIFICATE OF CORRECTION

| | | |
|---|---|---|
| PATENT NO. | : 8,829,097 B2 | Page 1 of 1 |
| APPLICATION NO. | : 13/768685 | |
| DATED | : September 9, 2014 | |
| INVENTOR(S) | : Deaner et al. | |

It is certified that error appears in the above-identified patent and that said Letters Patent is hereby corrected as shown below:

Title page, item (72), lines 2 and 4, under Inventors:

Delete Inventor Gronlund's State "WA" and insert --WI--

Delete Inventor Reed's State "MN" and insert --WI--

In the Claims,

Column 33 -- Line 65
Delete "building components" and insert --building component--

Column 35 -- Line 31
Delete "Thereof" and insert --thereof--

Signed and Sealed this
Ninth Day of December, 2014

Michelle K. Lee
*Deputy Director of the United States Patent and Trademark Office*